United States Patent [19]
Lucas

[11] Patent Number: 5,235,418
[45] Date of Patent: Aug. 10, 1993

[54] METHOD AND APPARATUS FOR LOW FREQUENCY REMOVAL IN VECTOR QUANTIZATION

[75] Inventor: Keith Lucas, Richmond Hill, Canada
[73] Assignee: Scientific-Atlanta, Inc., Atlanta, Ga.
[21] Appl. No.: 794,487
[22] Filed: Nov. 19, 1991
[51] Int. Cl.$^5$ .............................................. H04N 7/13
[52] U.S. Cl. ..................................... 358/133; 375/27
[58] Field of Search ................ 358/105, 133, 135, 136, 358/138; 375/27

[56] References Cited

U.S. PATENT DOCUMENTS

| | | | |
|---|---|---|---|
| 4,878,230 | 10/1989 | Murakami | 358/136 |
| 5,086,439 | 2/1992 | Asai | 358/133 |

OTHER PUBLICATIONS

"Vector Quantization of Digital Images", Baker, Richard L., Stanford University-University Microfilms International, UMI Dissertation Information Service (Copyright 1984).

"Vector Quantization", Gray, Robert M., *The Institute of Electrical and Electronics Engineers, Inc.*, ASSP Mag., vol. 1, pp. 4–29, Apr. 1984.

"Interpolative Vector Quantization of Color Images", Hang, Hsueh-Ming and Haskell, Barry G., IEEE Transactions on Communications, vol. 36, No. 4, Apr. 1988.

"A Finite State/Frame Difference Interpolative Vector Quantizer for Low Rate Image Sequence Coding", Shen, Hsiao-hui, et al., *Proc. IEEE Int. Conf. Acoust., Speech, Signal Processing*, vol. 2, pp. 1188–1191, Apr. (1988).

*Primary Examiner*—Howard W. Britton
*Attorney, Agent, or Firm*—Woodcock Washburn Kurtz Mackiewicz & Norris

[57] ABSTRACT

A method and apparatus for low-frequency removal in vector quantization of an image frame. An image frame is converted to plurality of input vectors. A mean value of each input vector is determined and transmitted to a plurality of reception sites. A low-frequency component of each input vector is then determined and removed from the input vector. A scalar mean value of each low-frequency removed vector is then determined and subtracted therefrom to produce a residual vector. The residual vectors are then vector quantized and the vector quantized data is transmitted to the reception sites. At a reception site, the transmitted mean values and vector quantized data are received and each input vector is reproduced therefrom. From the reproduced input vectors, the image frame is recreated for display at the reception site.

46 Claims, 15 Drawing Sheets

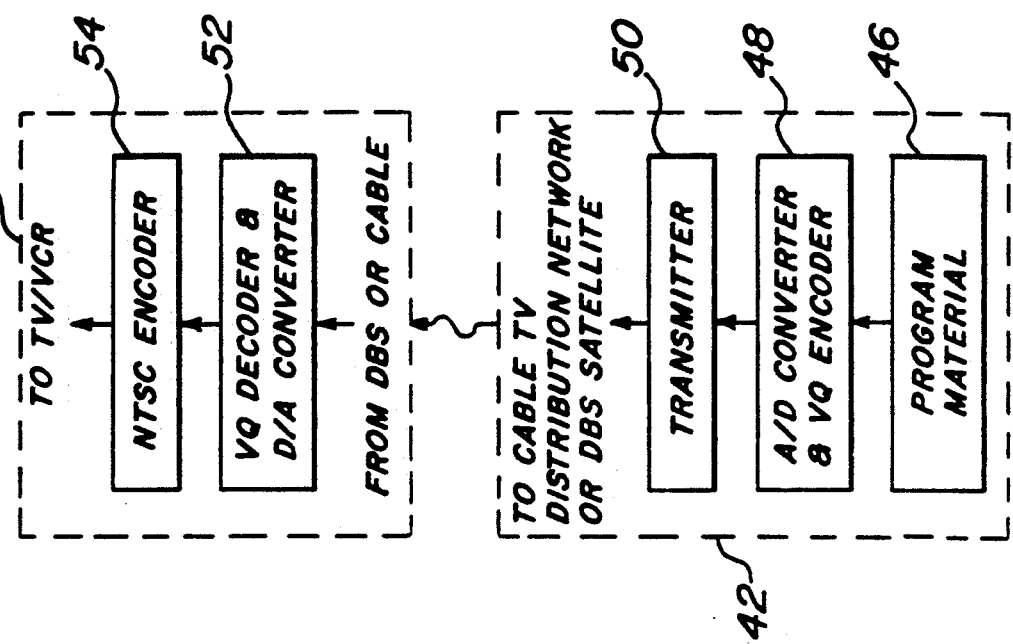

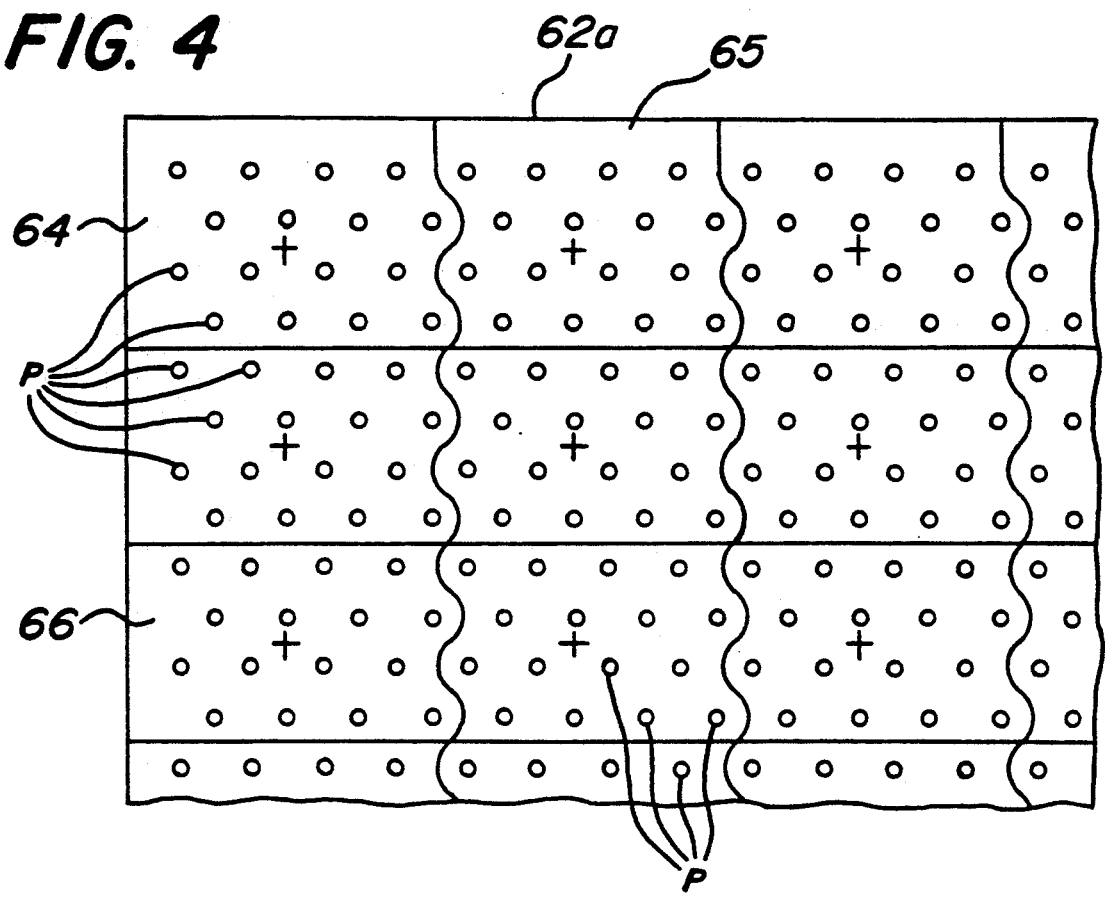

FIG. 8

$$\begin{bmatrix} 1 & 5 & 9 & 13 & 15 & 11 & 7 & 3 \\ 9 & 21 & 33 & 45 & 39 & 27 & 15 & 3 \\ 5 & 25 & 45 & 65 & 75 & 55 & 35 & 15 \\ 21 & 49 & 77 & 105 & 91 & 63 & 35 & 7 \\ 7 & 35 & 63 & 91 & 105 & 77 & 49 & 21 \\ 15 & 35 & 55 & 75 & 65 & 45 & 25 & 5 \\ 3 & 15 & 27 & 39 & 45 & 33 & 21 & 9 \\ 3 & 7 & 11 & 15 & 13 & 9 & 5 & 1 \end{bmatrix} \times \frac{1}{128}$$

$A_{m,n}$

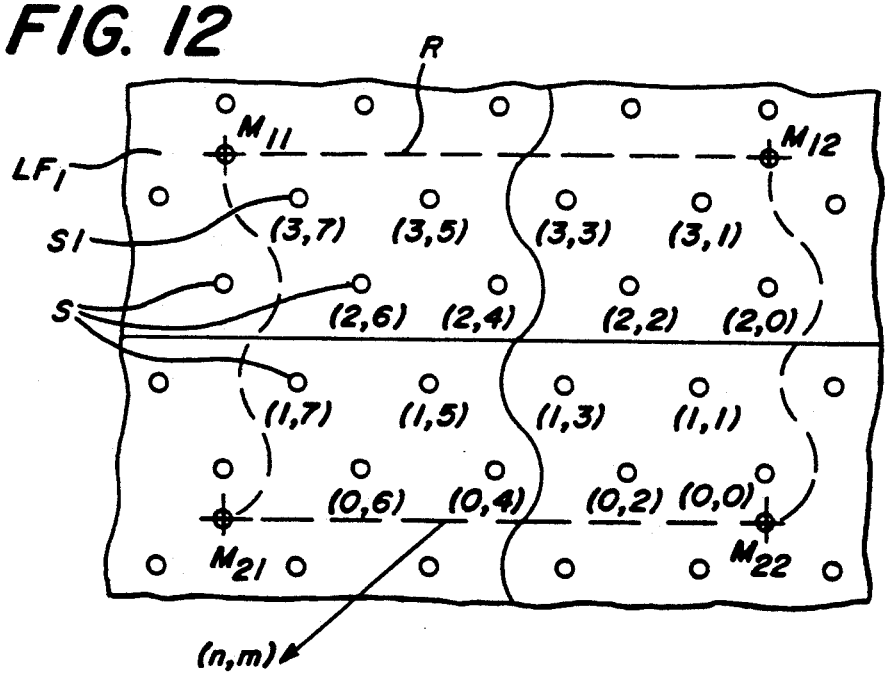

FIG. 12

$n = 0, 2 \rightarrow m = 0, 2, 4, 6$
$n = 1, 3 \rightarrow m = 1, 3, 5, 7$ $$S[n,m] = \underline{LF}[n,m] = \left(\frac{2n+1}{8}\right)\left(\frac{2m+1}{16}\right)M_{11} + \left(1 - \frac{2n+1}{8}\right)\left(\frac{2m+1}{16}\right)M_{21}$$

$$+ \left(\frac{2n+1}{8}\right)\left(1 - \frac{2m+1}{16}\right)M_{12} + \left(1 - \frac{2n+1}{8}\right)\left(1 - \frac{2m+1}{16}\right)M_{22}$$

$$M \begin{bmatrix} 9 & 48 & 7 \\ 48 & 288 & 48 \\ 7 & 48 & 9 \end{bmatrix} \times \frac{1}{512} \approx M \begin{bmatrix} 1 & 6 & 1 \\ 6 & 36 & 6 \\ 1 & 6 & 1 \end{bmatrix} \times \frac{1}{64}$$

$\underline{LF} = \underline{LF_0} + M_{LF}$

METHOD AND APPARATUS FOR LOW FREQUENCY REMOVAL IN VECTOR QUANTIZATION

RELATED APPLICATION DATA

The subject matter of this application is related to the subject matter of the following co-pending patent applications:

U.S. Ser. No. 794,589, entitled "Image Compression Method and Apparatus Employing Distortion Adaptive Tree Search Vector Quantization with Avoidance of Transmission of Redundant Image Vector Data"; and, U.S. Ser. No. 794,491, entitled "Method and Apparatus for Transforming Between Fixed Rate Vector Quantized Data and Variable Rate Vector Quantized Data".

FIELD OF THE INVENTION

The present invention relates generally to a data compression method and apparatus. More particularly, the present invention relates to a method and apparatus for low-frequency removal in vector quantization of an image frame.

BACKGROUND OF THE INVENTION

The background of the present invention is described herein in the context of pay television systems, such as cable television systems or direct broadcast satellite (DBS) systems, that distribute program material to subscribers, but the invention is by no means limited thereto except as expressly set forth in the accompanying claims.

In a typical cable television system, cable television operators receive much of their program material from remote earth station transmitters via a plurality of geosynchronous orbit satellites. The cable operator selects the program material to be made available to its subscribers by making arrangements with the satellite distributors of that program material. The cable operator receives the transmitted program material at its "cable head-end," where it then re-transmits the data to individual subscribers. Frequently, cable operators also provide their own local programming at the site of the head-end, and further include network broadcasts as well.

In a DBS system, individual subscribers are provided with their own satellite receiver. Each subscriber establishes a down-link with the broadcasting satellite directly. Thus, there is no need, as with cable systems, for re-transmission from a cable head-end.

Typically, in both types of systems (cable and DBS), the program material (both video and audio) is originally in analog form. Conventional transmission techniques place substantial limitations on the maximum number of viewer channels that can be transmitted over any given transponder on a satellite since each channel requires a minimum bandwidth to avoid noticeable degradation and the total number of channels that can be transmitted over a given satellite transponder is limited by the bandwidth of each signal, and of the transponder. Also, in cable systems, the electrical properties of the coaxial cable limit its bandwidth and therefore place substantial limitations on the number of channels that can be delivered to cable television subscribers using conventional transmission techniques.

As a result of the desire to provide more program channels and/or HDTV to subscribers over existing broadcast bandwidths, the pay television industry has begun to investigate digital image transmission techniques. Although the desire is to minimize the transmission bandwidth of program material, thus allowing more channels to be transmitted over an existing broadcast bandwidth, digital image transmission further offers the advantage that digital data can be processed at both the transmission and reception ends to improve picture quality. Unfortunately, the process of converting the program material from analog form to digital form results in data expansion which increases the transmission bandwidth of the program material rather than decreasing it. Therefore, digital transmission alone does not solve the bandwidth problem, but instead makes it worse. However, through the application of digital data compression techniques, large bandwidth reductions can be achieved.

Data compression techniques minimize the quantity of data required to represent each image. Thus, more program material, or more channels, can be offered over an existing broadcast bandwidth. However, any data compression achieved is offset by the data expansion which occurs during the analog to digital conversion. Therefore, to be practical, the compression technique employed must achieve a compression ratio high enough to provide a net data compression. Digital data compression techniques, such as Huffman encoding and LZW (Lempel, Ziv and Welch) encoding, offer, at best, compression ratios of 2.5 to 1 and do not compensate sufficiently for the data expansion that occurs in converting data from analog to digital form.

In response to the need for high compression ratios, a number of so-called "lossy" compression techniques have been investigated for digital image compression. Unlike the Huffmann and LZW encoding techniques, these "lossy" compression techniques do not provide exact reproduction of the data upon decompression. Thus, some degree of information is lost; hence the label "lossy." One such "lossy" compression technique is called DCT (direct cosine transform) data compression. Another method, which, until recently, has been used principally for speech compression, is vector quantization. Vector quantization has shown promise in image compression applications by offering high image compression ratios, while also achieving high fidelity image reproduction at the receiving end. It has been demonstrated, for example, that using vector quantization (hereinafter sometimes referred to as "VQ"), compression ratios as high as 25:1, and even as high as 50:1, can be realized without significant visually perceptible degradation in image reproduction.

Compression of video images by vector quantization initially involves dividing the pixels, or samples, of each image frame into smaller blocks of pixels, or sub-images, and defining a "vector" from relevant data (such as intensity and/or color) reported by each pixel in the sub-image. The vector (sometimes called an "image vector" or "input image vector" or "input vector") is really nothing more than a matrix of values (intensity and/or color) reported by each pixel in the sub-image. For example, a black and white image of a house might be defined by a 600×600 pixel image, and a 4×4 rectangular patch of pixels, representing, for example, a shadow, or part of a roof line against a light background, might form the sub-image from which the vector is constructed. The vector itself might be defined by a plurality of gray scale values representing the intensity reported by each pixel. While a black and white image serves as an example here, vectors might also be formed from red, green, or blue levels of a color image, or from the Y, I and Q components of a color image, or from transform coefficients of an image signal. The terms "pixel" and "sample" may be used interchangeably herein to refer to the individual values or elements of a vector.

Numerous methods exist for manipulating the block, or sub-image, to form a vector. R.M. Gray, "Vector Quantization", *IEEE ASSP Mag.*, pp. 4–29 (April, 1984), describes formation of vectors for monochrome images. E.B. Hilbert, "Cluster Compression Algorithm: A Joint Clustering/Data Compression Concept", Jet Propulsion Laboratory, Pasadena, Calif., Publ. 77-43, describes formation of vectors from the color components of pixels. A. Gersho and B. Ramamurthi, "Image Coding Using Vector Quantization", *Proc. IEEE Int. Conf. Acoust., Speech, Signal Processing,* pp. 428–431 (May, 1982), describes vector formation from the intensity values of spatially contiguous groups of pixels. All of the foregoing references are incorporated herein by reference.

By way of example, a television camera might generate an analog video signal in a raster scan format having 600 scan lines per frame. An analog to digital converter could then digitize the video signal at a sampling rate of 600 samples per scan line, each sample being a pixel. Digital signal processing equipment could then store the digital samples in a 600×600 pixel matrix. The 600×600 pixel matrix could then be organized into smaller blocks, for example 4×4 pixel blocks, and then each block could be converted into an image vector. Each of these image vectors would then be compressed as described below.

In an image vector quantizer, a vector quantization "codebook" is created from training data comprising a representative sample of images which the quantizer is likely to encounter during use. The codebook consists of a memory containing a set of stored "codevectors," each representative of commonly encountered image vectors. For example, one codevector might be a 4×4 pixel solid black patch. Another codevector might have all white pixels in the top two rows, and all black pixels in the bottom two rows. Yet another codevector might have a gradient made up of white pixels in the top row, black pixels in the bottom row, and two rows of pixels in between having shades of gray from light to dark. Typically, a codebook of representative codevectors is generated using an iterative clustering algorithm, such as described in S.P. Lloyd, "Least Squares Optimization in PCM", *Bell Lab. Tech. Note*, (1957) (also found in IEEE Trans. Inform. u Theory, Vol. IT-28, pp. 129–137, March (1982); and, J.T. Tou and R.C. Gonzalez, "Pattern Recognition Principles", pp. 94–109, Addison-Wesley, Reading, Mass. (1974). Both of these references are incorporated herein by reference.

Each codevector in the codebook is assigned a unique identification code, sometimes called a label. In practice, the identification codes, or labels, are the memory addresses of the codevectors. (In the appended claims, the term "ID code" is sometimes employed to refer to these labels or addresses). For each input image vector, data compression is achieved by selecting the codevector in the codebook that most closely matches the input image vector, and then transmitting the codebook address of the selected codevector rather than the input image vector. Compression results because generally, the addresses of the selected codevectors are much smaller than the image vectors.

By way of example, the codevector having the solid black patch described above, might be assigned address #1. The codevector having the white pixels in the top half and black pixels in the bottom half might be assigned address #2, and so on for hundreds or thousands of codevectors. When quantizing a full image, a vector quantizer divides the full image frame into a series of image vectors (i.e., from each of the blocks of sub images). For each image vector, the vector quantizer identifies one closely matching codevector. The vector quantizer then generates a new signal made up of the series of labels, or memory addresses where the codevectors were found. For the example of a full image of a house, the vector quantizer would divide the full image into numerous image vectors (from each of the blocks, or sub images). The quantizer might then replace image vectors from shadowed areas with address #1 (the solid black patch), and it might replace the roof line image vectors with address #2 (white in the top half and black in the bottom half). As mentioned above, compression results because, typically, the length of the labels or addresses is much smaller than the size of the codevectors stored in memory. Typically, the addresses are transmitted by any conventional technique so that the image can be reconstructed at the receiver.

Reconstruction of the original full image at the receiver (or at least a very close approximation of the original image) may be accomplished by a device which has a codebook, identical to the codebook at the transmitter end, stored in a memory. The device that performs vector quantization and compression at the transmitter is called an encoder, and the device that performs decompression and image reproduction at the receiving end is called a decoder. The decoder reconstructs (at least an approximation of) the original image by retrieving from the codebook in the decoder the codevectors stored at each received address. Generally, the reconstructed image differs somewhat from the original image because codevectors do not usually precisely match the image vectors. The difference is called "distortion." Increasing the size of the codebook generally decreases the distortion.

Many different techniques for searching a codebook to find the codevector that best matches the image vector have been proposed, but generally the methods can be classified as either a full search technique, or a branching (or tree) search technique. In a full search technique, the vector quantizer sequentially compares an input image vector to each and every codevector in the codebook. The vector quantizer computes a measure of distortion for each codevector and selects the one having the smallest distortion. The full search technique ensures selection of the best match, but involves the maximum number of computational steps. Thus, while distortion can be minimized using a full search technique, it is computationally expensive. Y. Linde, A. Buzo and R. Gray, "An Algorithm For Vector Quantizer Design", *IEEE Transactions on Communications*, Vol. COM-28, No. 1 (January 1980), incorporated herein by reference, describes the full search technique and the computational steps involved in such a search. The full search technique is sometimes called "full search vector quantization" or "full search VQ".

The tree search technique reduces the number of codevectors that must be evaluated (and thus reduces search time), but does not necessarily identify the very best match. Consequently, to maintain a given level of distortion, the tree search technique requires a larger codebook than the full search technique. The tree search technique can be considered as one that searches a sequence of small codebooks, instead of one large codebook. The codebook structure can be depicted as a tree, and each search and decision corresponds to advancing along a branch of the tree to the next level or stage of the tree, starting from the root of the tree. Thus, only the codevectors along certain branches of the tree are searched, thereby reducing the search time. A detailed description of the tree search technique may be found in R.M. Gray and H. Abut, "Full Search and Tree Searched Vector Quantization of Speech Waveforms," *Proc. IEEE Int. Conf. Acoust., Speech, Signal Processing*, pp. 593-96 (May 1982), and R.M. Gray and Y. Linde, "Vector Quantization and Predictive Quantizers For Gauss Markov Sources", *IEEE Trans. Comm.*, Vol. COM-30, pp. 381-389 (February 1982), both of which are incorporated herein by reference. The tree search technique is sometimes referred to as "tree-search vector quantization", "tree-search VQ" and "TSVQ." Notwithstanding the larger memory that is required to maintain a given level of distortion, this technique has found favor for compressing dynamic images because it is computationally faster.

The construction and use of tree structured codebooks to perform vector quantization is described in the aforementioned article by R.M. Gray entitled "Vector Quantization", and in R.L. Baker, "Vector Quantization of Digital Images", Ph.D. Dissertation, Stanford University, Department of Electrical Engineering (1984). See also E.A. Riskin, "Variable Rate Vector Quantization of Images", Ph. D. Dissertation—Stanford University, pp. 51 et seq. (May, 1990); U.S. Pat. No. 4,878,230 of Murakami et al. entitled, "Amplitude Adaptive Vector Quantization System"; and the aforementioned article by Linde, Buzo and Gray entitled "An Algorithm for Vector Quantizer Design." All of these reference are incorporated herein by reference.

Another well known technique that may be employed in VQ systems is referred to as mean-removed VQ (MRVQ). MRVQ is well known and has numerous advantages. See, for example, the aforementioned article by R.M. Gray entitled "Vector Quantization" and the aforementioned Ph.D. dissertation by R.L. Baker entitled "Vector Quantization of Digital Images". With MRVQ, prior to searching the codebook for a best match codevector, the encoder determines the scalar mean value of the input vector (i.e., the mean value of all pixels in the vector) and then subtracts the mean value from each pixel (sample) in the vector. The vector resulting from this subtraction, i.e., the input vector with its mean value removed, is referred to as a "residual" vector. It is the residual vector that is then compared to the codevectors in the codebook to find the best match. Thus, the encoder codebook contains representative "residual" codevectors. After selecting a best match "residual" codevector, the encoder transmits both the address of the residual codevector and the mean value of the original input vector to the decoder. At the decoder, the input vector is reconstructed by retrieving from the decoder codebook (which is identical to the encoder codebook) the "residual" codevector residing at the received address and adding the received mean value to the retrieved codevector.

One advantage of MRVQ in particular is that for some input vectors, only the mean value need be transmitted to the decoder in order to substantially reconstruct the input vector at the decoder. For example, input vectors in uniform areas of an image frame, such as a "shaded" area or uniform background, will contain pixel values that are substantially equal. The mean value of a "shade" vector will not be substantially different than any single pixel value in the vector. The mean value can therefore be used to represent the entire input vector; that is, the input vector can be substantially reconstructed at the decoder by simply constructing a vector that has pixel (sample) values each equal to the mean value of the original "shade" input vector. Thus, at the encoder, only the mean value need be transmitted to the decoder for that "shade" input vector.

To determine whether an input vector can be approximated solely from its mean value, a measure of difference can be obtained between the input vector and its mean value, and the measure of difference can be compared to a threshold. If the measure of difference satisfies the threshold, then only the mean value is transmitted to the decoder for that input vector. If, however, the measure of difference exceeds the threshold then the mean value is subtracted from the input vector, the residual vector is vector quantized, and both the mean value and the codevector address resulting from the VQ process are transmitted to the decoder. When the decoder detects that a mean only was transmitted for a given input vector, it reconstructs that input vector from the mean value only; that is, the decoder approximates the input vector with a vector having pixel (sample) values all equal to the mean value (thus the approximation is a uniform vector). Such a method is disclosed in commonly assigned, co-pending U.S. application Ser. No. 794,516, filed Nov. 19, 1991, and entitled "Image Compression Method and Apparatus Employing Distortion Adaptive Tree Search Vector Quantization."

Transmitting only the mean values of "shade" vectors has at least two advantages. First, it increases the compression ratio of the VQ system. Second, the VQ codebook can be trained to concentrate on the high frequency detail of the image frame. However, there are some disadvantages to approximating "shade" vectors with their mean values.

Approximating "shade" vectors with their mean values at the encoder likely will lead to a visual effect known as "blocking" when the image frame is reconstructed at the decoder. Although shaded areas of the original image frame may appear fairly uniform to the human visual system, there may be slight variations over the area. Thus, the mean values of adjacent "shade" vectors may differ slightly. Approximating these "shade" vectors with uniform mean value vectors exaggerates the slight variations at the boundaries of the adjacent vectors. Thus, the human visual system perceives a blocking or checkerboard effect in the reconstructed image.

One method which has been suggested to reduce the blocking effect, involves applying a bi-linear (two-dimensional) interpolator to sub-samples in an image frame to obtain an approximation to a low-pass version of the image frame. Such a method is disclosed in R.L. Baker and Hsiao-hui Shen, "A Finite State/Frame Difference Interpolative Vector Quantizer For Low Rate Image Sequence Coding," *Proc. IEEE Int. Conf. Acoust., Speech, Signal Processing*, vol. 2, pp. 1188-1191 (April 1988). According to this method, for each input vector in the original image frame, the interpolator determines a low-frequency vector from the sub-samples. The low-frequency vector is an approximation to a low-pass version of the input vector. The low-pass version of each input vector is then subtracted from the input vector leaving a "residual" vector which approximates a high-pass version of the input vector. These residual vectors are then vector quantized and the codevector addresses produced by the quantizer are transmitted to the decoder along with the sub-samples used by the interpolator to generate the low-frequency version of each vector. At the decoder, the "residual" codevectors residing at the received addresses are retrieved from an identical codebook, and the low-pass version of each input vector is reconstructed from the received sub-samples using an interpolator identical to the one at the encoder. The low-pass version of each input vector is then added to the corresponding residual codevector to obtain a representation of the original input vector.

The main advantage of low-frequency removal over mean removal is that rather than approximating a "shade" input vector with the mean value of the vector, which results in substantial "blocking," the "shade" vector can be approximated by its low-pass version. As mentioned above, at the decoder, the low-pass version of the "shade" vector is reconstructed by applying the decoder interpolator to the received sub-samples. The reconstructed low-pass version is a better approximation to the "shade" vector than a mean value approximation because it is a vector valued prediction rather than a scalar one. Use of the low-pass version as an approximation to a "shade" vector, rather than a mean value approximation, reduces blocking.

However, although low-frequency removal/reconstruction reduces blocking, removal of the low-frequency component from each input vector introduces a d.c. offset in the residual vectors. As a result, the VQ process is more difficult because the vector quantizer must deal with these offsets.

Consequently there is a need for a method which allows for removal of the low-frequency component of each input vector as well as the d.c. offset of each residual vector, but which requires no additional information at the decoder to reconstruct the input vectors; that is, the input vectors can still be fully reconstructed using only the sub-samples and residual vector addresses received at the decoder. The present invention satisfies this need.

SUMMARY OF THE INVENTION

Briefly stated, the present invention is directed to a method and apparatus for low-frequency removal prior to vector quantization of an image frame. In the preferred embodiment, the method is embodied in a pay television system wherein image data (usually program material, such as movies, etc.) is vector quantized at a transmitter location of pay television signals and transmitted via satellite to a plurality of receiving locations. The image data typically comprises temporally spaced image frames representing moving images to be displayed on a television set at a reception sites.

According to the present invention, an image frame to be transmitted is received at the transmitter location and organized into a plurality of blocks of data. Each block is then converted to a multi-dimensional input vector. A mean value of each input vector is determined and stored. In addition, an indication of each mean value is transmitted to a plurality of reception sites. A vector quantization codebook is provided in a memory at the transmitter location. The codebook comprises a plurality of codevectors, each codevector being representative of a possible residual vector and having an associated ID code.

The following additional steps are performed for each input vector:
i) a portion of the mean values is processed to produce a low-frequency component vector representative of a low-pass version of the input vector;
ii) the low-frequency component vector is subtracted from the input vector to obtain a low-frequency removed vector;
iii) a mean value of the low-frequency removed vector is determined and subtracted therefrom to obtain a residual vector;
iv) a codevector that most closely resembles the residual vector is then selected from the codebook; and
v) an indication of the ID code associated with the selected codevector is transmitted to the reception sites.

At the reception sites, a second vector quantization codebook, identical to the codebook at the transmitter location, may be provided. The indications transmitted from the transmitter location are received at the reception site and the mean values and the ID codes transmitted for each input vector are obtained therefrom. The following steps may be performed at the reception site to reproduce each input vector at the reception site:
i) the obtained ID code for the input vector under consideration is selected, and the codevector associated with the obtained ID code is retrieved from the second codebook, the retrieved codevector being a substantial representation of the codevector selected at the transmitter location for that input vector;
ii) a low-frequency component vector substantially identical to the low-frequency component vector produced at the transmitter location for the input vector is again produced by processing at least a portion of the obtained mean values;
iii) a mean value of the low-frequency component vector produced in step (ii) above is determined and subtracted therefrom to obtain a zero-mean low-frequency component vector;
iv) the zero-mean low-frequency vector and the obtained mean value of the input vector are added to the codevector retrieved in step (i) above resulting in a substantial representation of the input vector.

Once all the input vectors in the image frame have been reproduced at the reception site, they are employed to substantially re-create the image frame for display on a television set at the reception site.

Other features of the invention will become evident from the following drawings and specification.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings, an embodiment that is preferred, it being understood, however, that the invention is not limited to the specific methods and instrumentalities disclosed. In the drawings:

FIG. 2 is a block diagram illustrating another application of the invention to a pay television system employing cable or direct broadcast satellite for transmitting program material;

FIG. 3 graphically illustrates the concept of constructing input image) vectors from pixels of image frames;

FIG. 4 graphically illustrates an image frame as defined by a plurality of pixels and organized into subimages or blocks of pixels;

FIGS. 6 illustrates an exemplary memory for storing a codebook;

FIG. 8 graphically illustrates the coefficients and spacial structure of a preferred implementation of the two-dimensional interpolating low-pass filter of FIG. 5;

FIG. 12 is an exploded view of the rectangular area depicted in FIG. 11, showing further, the mathematical expression for determining the individual sample values in the rectangular area;

DETAILED DESCRIPTION OF THE DRAWINGS

Before proceeding to the description of the drawings, it should be understood that, although the invention is described herein in the context of broadcasting television signals, such as movies and the like, in a pay television system, the present invention is in no way limited thereto. Rather, the present invention may be employed wherever it is desired to compress and transmit any type of data, including conventional (i.e., free) television broadcasts, image data, voice data, etc.

Figure 1:
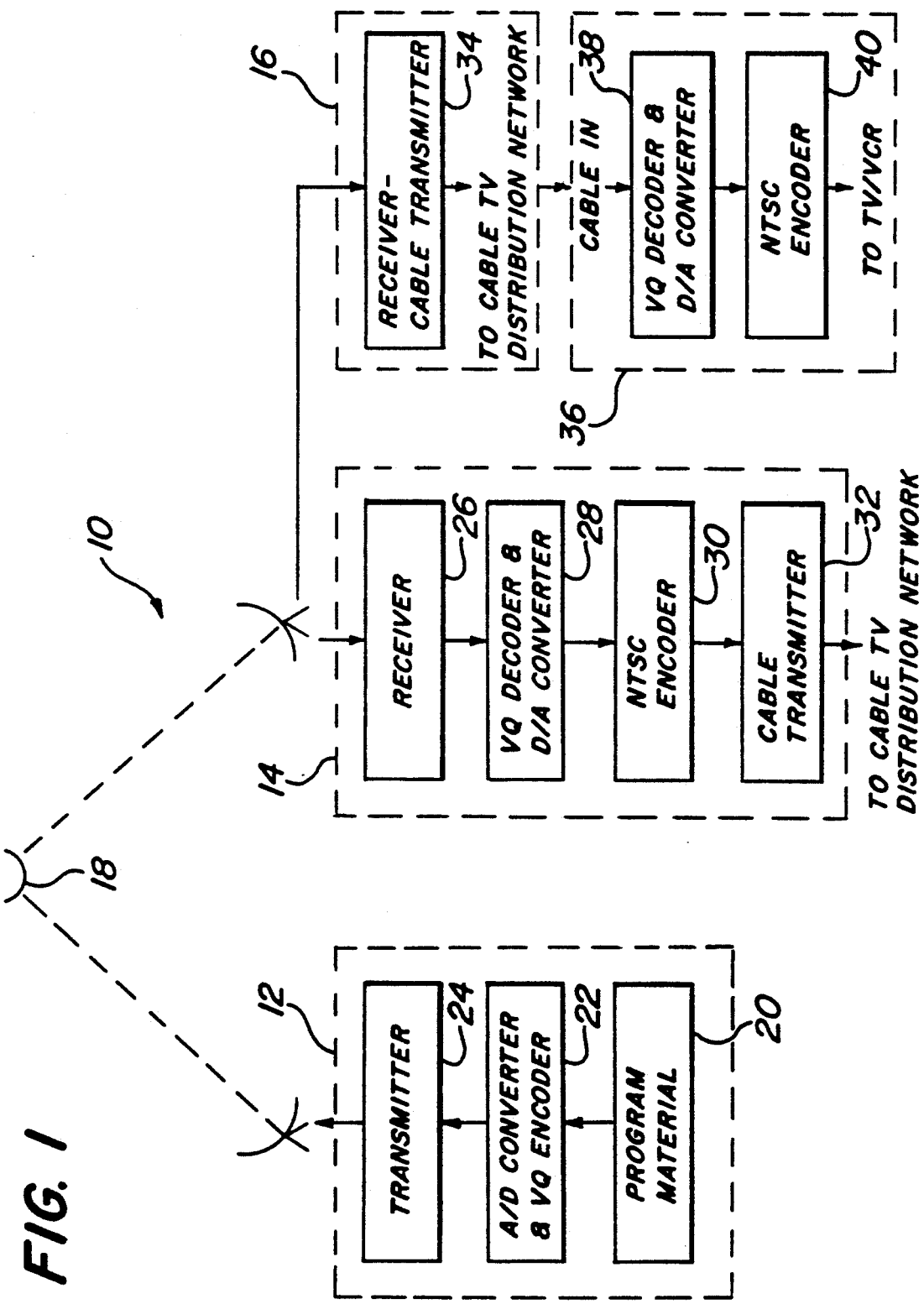
FIG. 1 is a block diagram illustrating an application of the present invention to a pay television system employing satellite communication to transmit program material.

Referring now to the drawings, wherein like numerals indicate like elements, there is illustrated in FIG. 1 an exemplary application of a vector quantization image compression system according to the present invention wherein moving image data (e.g., television signals, such as movies, etc.) is communicated from a point of origin 12 to receiving locations such as 14 or 16. Typically, the point of origin 12 might include a source 20 of program material that supplies movies, and the like in analog form to an apparatus (encoder) 22 for digitization and data compression by vector quantization. Details of apparatus 22 will be supplied hereinafter. Compressed, digitized data is transmitted to a satellite 18, via transmitter 24, for reception by a plurality of earth stations such as 14 or 16. The earth stations 14, 16 may be the head-end of a cable television distribution system of the type which receives signals from the satellite 18 and distributes them to a plurality of subscribers via coaxial cable. Alternatively, as will be explained in connection With FIG. 2, one or more of the earth stations may be DBS (direct broadcast satellite) subscribers who receive signals directly from the satellite 18. The term "pay television" and "pay television subscriber" is used in the instant specification and accompanying claims to encompass both cable television and direct broadcast satellite applications. However, as mentioned above, the invention is by no means limited to pay television systems, but has application to conventional (i.e., free) television transmission and reception.

Returning now to the cable television application of FIG. 1, there is shown two types of cable head end installations 14, 16 that may receive the down-link from the satellite 18. The cable head-end installation 14 may employ the received data in a different manner than the cable head end installation 16, however, the end result (availability of image data for display or recording) is the same to the cable television subscribers of each system. The two examples of cable head-end installations 14, 16 are shown to demonstrate the versatility of the present invention.

The cable head-end installation 14 may receive the data transmitted by the station 12 via receiver 26, then employ an on-site apparatus (decoder) 28 for decompressing the received data and converting the same back to analog form. Another on-site apparatus 30 may convert the analog data to conventional NTSC signals for transmission over the cable to subscribers in conventional form. Thus, in the case of cable head- end installation 14, the cable head-end operator distributes analog NTSC cable television signals to subscribers in conventional form via transmitter 32.

In the case of the cable head end installation 16, the data transmitted by station 12 may be received via a receiver/transmitter 34 that conditions the received data for transmission over the cable system to cable television subscribers. That is, the operator of the cable head end system 16 does not decode or decompress the received data, nor does it convert the same to analog form. Rather, the operator of the cable head-end system 16 simply transmits the compressed image data over the cable television distribution network for receipt by the subscribers. Subscribers of the system 16 must therefore be provided with VQ decoder boxes 36 (described in detail hereinafter), whereas subscribers to the system 14 may employ conventional set-top decoders. The VQ decoder boxes 36, in general, comprise a VQ decoder 38 for decompressing received data and converting the same to analog form and an apparatus 40 for converting the analog data to NTSC format for display on a TV or recording on a VCR. The decoder box 36 may be embodied as a set-top decoder, or may be built into a television set or VCR.

While subscribers to the system 16 must use the above-described decoder box 36, an advantage of the system 16 is that, due to the highly compressed nature of the image data sent over the cable distribution network by the cable operator, many more channels may be transmitted over the cable to subscribers as may be transmitted over the cable in the system 14. Alternatively, the system 16 enables transmission of HDTV signals without sacrificing other channel space.

FIG. 2 illustrates another application of the present invention, also to a pay television system. In the system of FIG. 2, block 42 represents a cable or DBS head-end. The operator of the head end 42 may insert program material 46 (such as network television stations, video tapes, etc.) directly at the locale of the head-end for transmission (via either cable or DBS) to the subscribers. Thus, as shown in FIG. 2, the head-end 42 may include an apparatus (encoder) 48 for digitizing and compressing the locally provided program material 46, and a transmitter 50 for transmitting data from encoder 48 (again, via either cable or satellite) to each of the subscribers. The encoder 48 may be of the same type as encoder 22.

Each subscriber to the system of FIG. 2 is equipped with a decoder box 44 (that may be identical to the decoder box 36 of FIG. 1) that comprises apparatus (decoder) 52 for decompressing received data and converting the same to analog form. The decoder 44 may also be provided with apparatus 54 for placing the analog data into NTSC format for display on a television set or for recording via a VCR. As in the case of decoder box 36, the decoder 44 may be embodied as either a set-top decoder box, or may be built into a television set or VCR.

FIG. 3 illustrates the concept of converting moving or dynamic images 60, such as program material 20 or 46, into input image vectors for vector quantization. The concept illustrated in FIG. 3 is well known. See, for example, R.L. Baker, "Vector Quantization of Digital Images", Ph.D. Dissertation, Stanford University, Department of Electrical Engineering (1984); Gray, R.M., "Vector Quantization", *IEEE ASSP Mag.*, Vol. 1, pp. 4,29 (April 1984); Goldberg, M., Boucher, P.R. and Shlien, S., "Image Compression Using Adaptive Vector Quantization", *IEEE Comm.*, Vol. COM-34 No. 2 (February 1986); and, Nasrabadi, N.M. and King, R.A., "Image Coding Using Vector Quantization; A Review", *IEEE Comm.*, Vol. 36, No. 8 (August 1988).

As shown in FIG. 4, and as is common in the art, each of the temporally spaced image frames 62a, 62b, 62c, etc., representing the moving image 60, is defined by a plurality of pixels, or samples, P. In the case of a black and white image, each pixel P reports an intensity value, whereas in the case of a color image, each pixel may report luminance and chrominance values, or other values indicative of a color associated with the pixel.

As mentioned in the background section above, in vector quantization of an image, e.g., image frame 62a, the pixels P of each image frame are grouped into blocks, e.g. 64, 65, 66, that define sub-images of each image frame. Each of these blocks which is a matrix of pixels, defines an input image vector. Thus, referring again to FIG. 3, a sub-image 64 of image frame 62a is represented by the block of pixels $P_{11}, P_{12}, \ldots P_{44}$. This matrix of pixels defines one input image vector for image frame 62a. Image frame 62a, as well as each succeeding image frame 62b, 62c, etc., will be represented by a plurality of input image vectors, i.e., one for each sub-image. As shown in FIGS. 3 and 4, in the preferred embodiment, the input vectors are 4×4 pixel vectors, however, it is understood that any size vector may be used without deviating from the spirit and scope of the present invention.

In the preferred embodiment, and as best illustrated in FIG. 4, the image frames are produced by a quincunx sampling technique; that is, the matrix of pixels or samples representing the image frame comprises a plurality of horizontal lines of pixels (sometimes hereinafter referred to as horizontal scan lines) wherein the pixels in each successive line are offset horizontally from the pixels in the previous line by approximately one-half the distance between horizontally adjacent pixels. Thus, portions or sub-matrices of the image frame form a quincunx, and input vectors constructed from those portions may be referred to as quincunx vectors. Quincunx sampling is well know in the art. It is understood, however, that although quincunx sampling is used in the preferred embodiment, any form of image sampling may be used. For example, orthogonal sampling may be used wherein the pixels in successive horizontal scan lines are not offset from each other.

As graphically shown at 65 of FIG. 3, the intensity and/or color values reported by each pixel, or sample, P are digitized (by the A/D converter shown at 22 and 48 of FIGS. 1 and 2). For example, each intensity or color value may be represented by an 8 bit digital word such that 256 intensity and/or color levels are possible for each pixel. Thus, in the case of a black and white image, only one input vector, containing the intensity values reported by each pixel in the block, is required for each block or sub-image. However, in the case of a color image, it may be desirable to provide several input image vectors for each block or sub-image, e.g., one input image vector containing intensity data and another containing color data. Another possibility is that three input image vectors are provided for each block in a color image, one containing Y data, another containing I data, and a third containing Q data.

It will be appreciated from the foregoing that, in the case of image data, input vectors will usually be multi-dimensional and usually have at least two dimensions (e.g., the matrix of intensity values shown in FIG. 3). However, there may be instances where input vectors are uni-dimensional, for example, where input vectors are constructed from the intensity values of only single rows or columns of pixels. Alternatively, input vectors may have more than two dimensions, for example, where input vectors are constructed from pixel blocks of two or more temporally spaced image frames (known as three dimensional vector quantization), and/or where data in addition to intensity data (e.g., color) is included in each vector.

Figure 5:
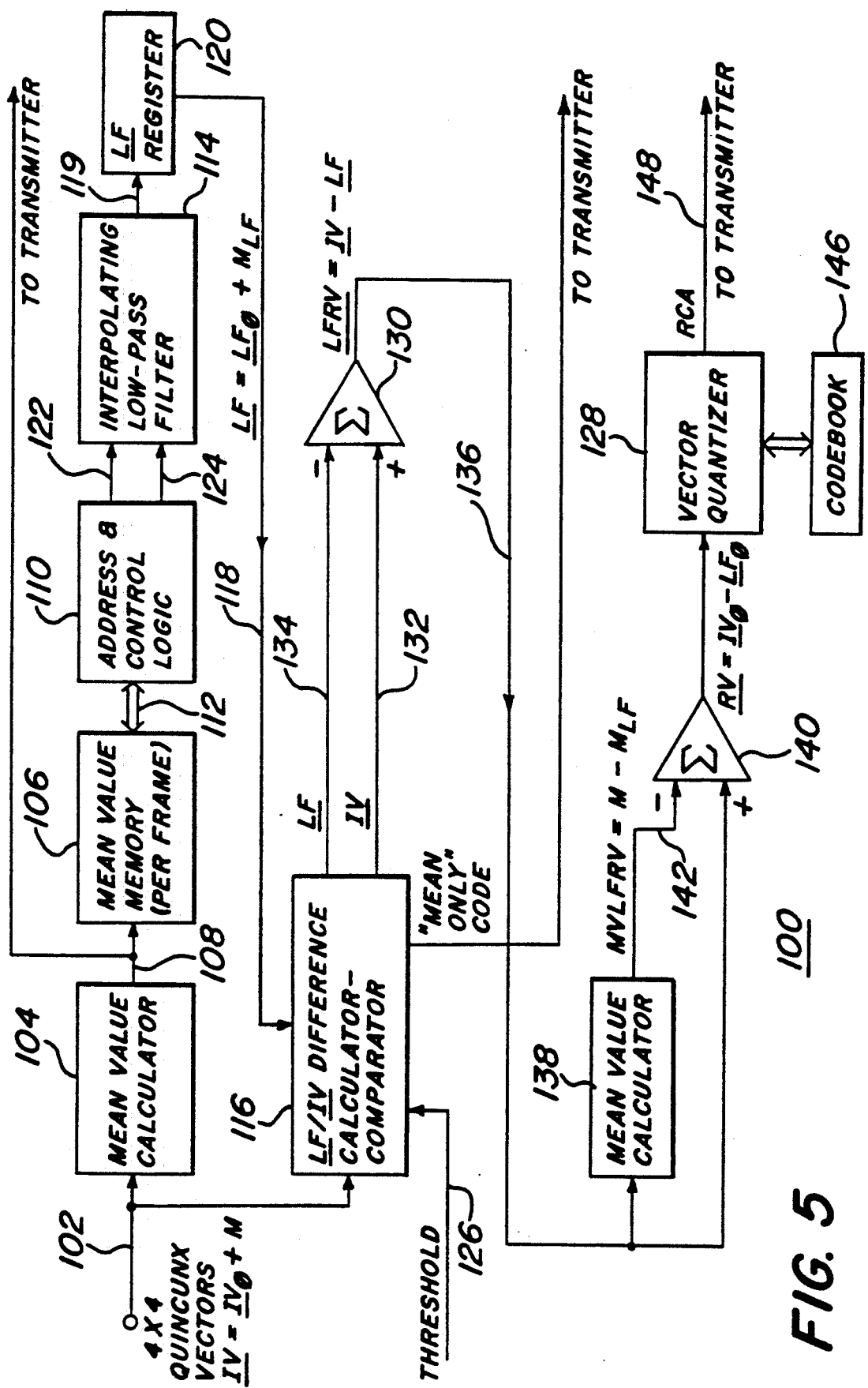
FIG. 5 is a block diagram of a preferred embodiment of an encoder apparatus for carrying out a portion of the low-frequency removal method of the present invention.

Referring now to FIG. 5, there is shown a block diagram of a VQ encoder apparatus 100 for carrying out the low-frequency removal method of the present invention. The encoder apparatus 100 may be employed to implement blocks 22 and 48 of FIGS. 1 and 2. Input vectors for a current image frame (i.e., the vectors constructed from the digitized blocks or sub-matrices of the image frame) are received for compression and sequentially transmitted via a line 102 to a mean value calculator 104. Each input vector IV can be expressed mathematically as follows:

$$IV = IV_0 + M,$$

where

M is the mean value of the vector; and $IV_0$ is a zero-mean vector representing IV with its mean value removed.

The mean value calculator computes the scalar mean value M of each input vector and supplies each mean value M to a mean value memory 106 via line 108. Thus, the input vector mean values for the entire current image frame are computed and stored in the memory 106. Each computed mean value M is also provided to a transmitter (not shown) via line 108 for transmission to a plurality of reception sites.

Each IV is also sequentially provided, via line 102, to a difference calculator/comparator 116. For a given IV, the calculator 116 computes a measure of difference between the IV and a low-frequency component vector LF (the construction of which is described hereinafter) which approximates a low-pass version of the IV. Any suitable measure of difference may be employed, such as, for example, a least-squares measure. The LF can be expressed mathematically as follows:

$$LF = LF_0 + M_{LF},$$

where $M_{LF}$ is the mean value of LF; and $LF_0$ is a zero-mean vector representing LF with its mean value removed.

The LF is provided to the calculator via a line 118 from an LF register 120.

Address and control logic 110 bi-directionally communicates with the memory 106 via bus 112 to retrieve the mean value M of the current IV under consideration by calculator 116, as well as the mean values M of all IV's adjacent the current IV in the image frame. As used herein and in the claims, "adjacent" means horizontally, vertically and diagonally adjacent. These mean values are provided, via a line 122 to an interpolating low-pass filter 114 which constructs the LF. The interpolating filter 114 is described hereinafter in greater detail. The filter 114 also receives control signals from the control logic 116 via a line 124. From the mean values of the current IV and IV's adjacent the current IV, the filter 114 interpolates the individual samples or elements that comprise the low-frequency component vector LF for the current IV under consideration. Each interpolated sample is transmitted, in turn, to the LF register 120, via a line 119, which stores the completed low-frequency component vector LF (i.e., all 16 samples). As mentioned previously, the LF for the current input vector is then provided to the calculator 116 via line 118.

The calculator 116 compares the measure of difference between the current IV and LF to a threshold value which is provided to the calculator via a line 126. The threshold value may be provided from any source. For example, the threshold value may be a pre-selected fixed value, or may be a dynamic value provided, for example, by a threshold adjust circuit (not shown) in the manner disclosed in co-pending U.S. patent application, Ser. No. 794,516, filed Nov. 19, 1991, and entitled "Image Compression Method and Apparatus Employing Distortion Adaptive Tree Search Vector Quantization." For purposes described hereinafter, the calculator 116 provides the current IV to the "+" input of an adder 130 via line 132 and provides the corresponding LF to the "−" input of the adder 130 via line 134, only if the measure of difference exceeds the threshold. If, however, the measure of difference is less than the threshold, then the calculator 116 does not provide the current IV and LF to the adder 130, but rather provides a "mean only" instruction code to the transmitter (not shown) via line 136.

If the current IV and LF are provided to the adder 130 (i.e., if the measure of difference exceeds the threshold), the adder 130 subtracts the low-frequency component vector LF from the IV to produce a low-frequency removed version of the IV (LFRV). Thus, the LFRV approximates a high-frequency version of the current IV. The LFRV can be expressed mathematically as follows:

$$LFRV = IV - LF = IV_0 - LF_0 + M - M_{LF}.$$

The LFRV is provided via a line 136 to a second mean value calculator 138 and to the "+" input of a second adder 140. The mean value calculator 138 computes the scalar mean value of LFRV (MVLFRV = M − $M_{LF}$) and supplies the result to the "−" input of the adder 140 via a line 142. The adder 140 subtracts the MVLFRV from each element of the LFRV to supply, on a line 144, a residual vector RV (RV = $IV_0$ − $LF_0$).

The RV is provided via line 144 to a vector quantizer 128 which bi-directionally communicates with a vector quantization codebook 146 having a plurality of "residual" codevectors RC. Each residual codevector RC in the codebook is representative of a possible residual vector RV. As is typical in the art, the codebook is provided in a memory (not shown) and each codevector has an associated memory address. FIG. 6 illustrates an exemplary memory M containing a codebook of codevectors. In the figure, each codevector CV has an associated address A which uniquely identifies that codevector.

Referring again to FIG. 5, those skilled in the art will appreciate that a vector quantizer may be implemented in many ways, and without deviating from the spirit and scope of the present invention, the vector quantizer 128 is not limited to any one implementation. For example, the vector quantizer 128 may employ a full-search technique such as that described in the aforementioned article by Y. Linde, A. Buzo and R. Gray entitled "An Algorithm For Vector Quantizer Design." Alternatively, the vector quantizer 128 may employ a distortion adaptive search algorithm such as that disclosed in co-pending U.S. patent application, Ser. No. 794,516, filed Nov. 19, 1991, and entitled "Image Compression Method and Apparatus Employing Distortion Adaptive Tree Search Vector Quantization."

Those skilled in the art will also appreciate that vector quantization codebooks may have many structures, such as a flat or full-search structure or a tree-structure. Again, without deviating from the spirit and scope of the present invention, the codebook 146 is not limited to any one structure. It will be appreciated that the structure of the codebook typically depends on the vector quantizer implementation. For example, the distortion adaptive vector quantizer mentioned above employs a tree-structured codebook.

The vector quantizer 128 selects from the codebook 146, the residual codevector RC that most closely resembles the residual vector RV. The vector quantizer 128 provides the address of the selected RC (RCA) to the transmitter (not shown) via line 148. Compression is achieved, because, as described in the background, the address of the selected codevector RCA is generally smaller than the original input vector IV.

The transmitter (not shown), which may be the transmitter 24 of FIG. 1 or the transmitter 50 of FIG. 2, transmits at least an indication of the RCA to the reception sites. As mentioned above, the transmitter also transmits the mean value of each input vector IV to the reception sites. Also, recall that if the measure of difference between a current IV and LF is less than the threshold value, then vector quantization will not be performed for that IV, but instead a "mean only" instruction code is provided to the transmitter and only that code is transmitted for that IV.

In an alternate embodiment, the mean values, "mean only" instruction codes, and RCAs transmitted to the reception sites may be Huffman encoded by the encoder 100 for further compression prior to transmission to the reception sites. Huffman encoding is well known in the art and the implementation of such encoding in a VQ encoder is described in co-pending U.S. patent application, Ser. No. 794,516, filed Nov. 19, 1991, and entitled "Image Compression Method and Apparatus Employing Distortion Adaptive Tree Search Vector Quantization."

Figure 7A:
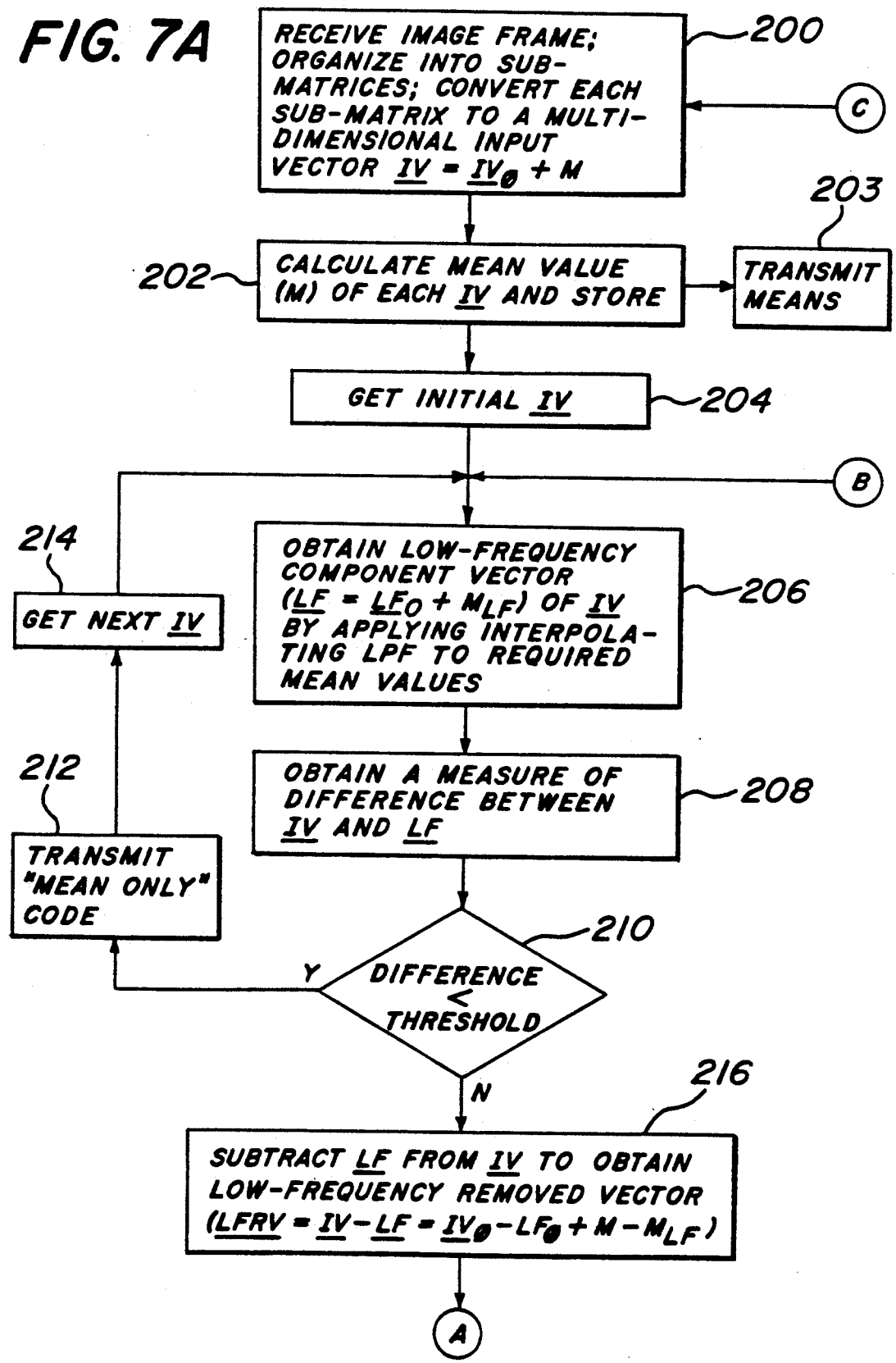
FIGS. 7A-7B are a flowchart illustrating both the operation of the apparatus of FIG. 7 and a preferred embodiment of the encoder portion of the low-frequency removal method of the present invention.
Figure 7B:
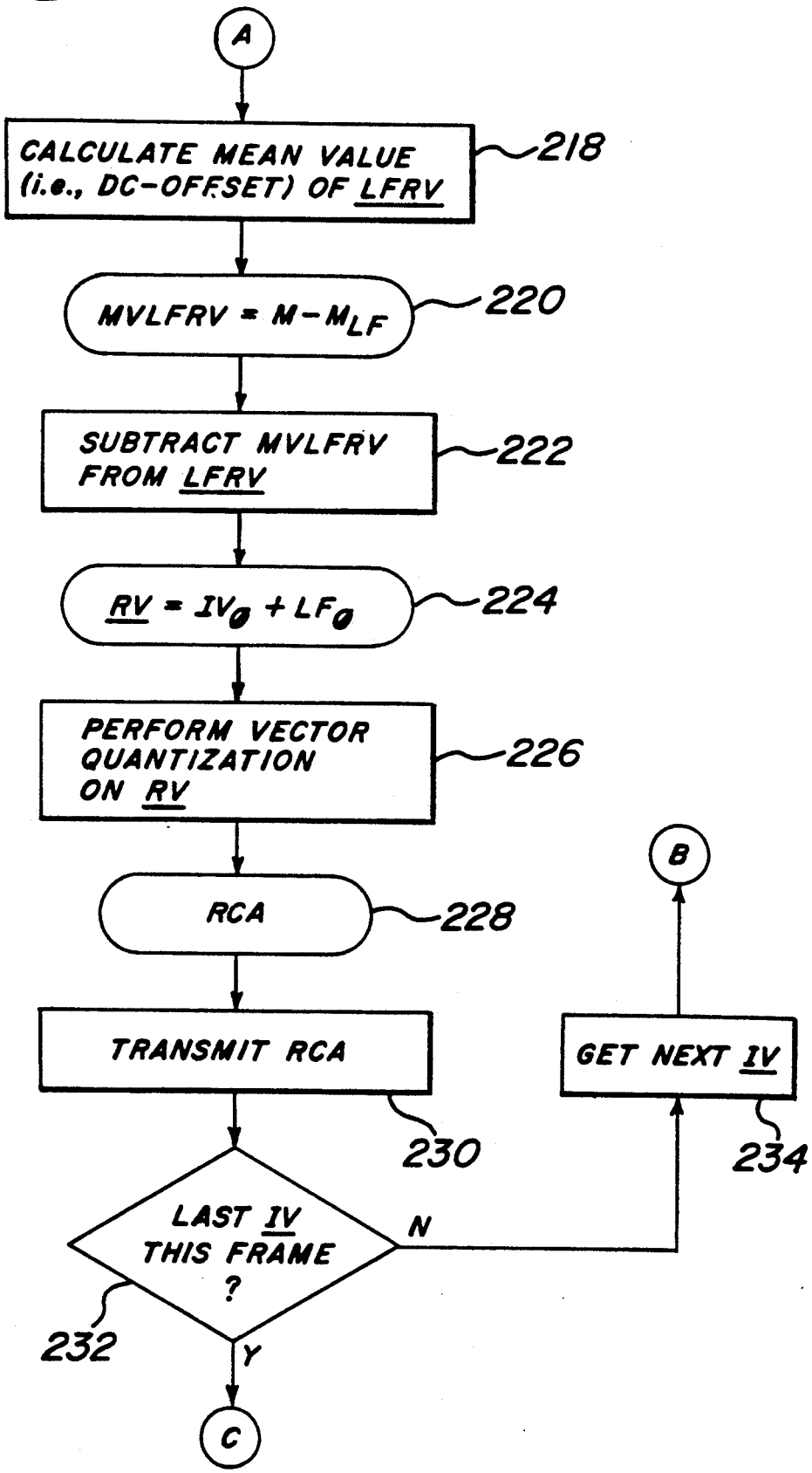

FIGS. 7A-7B are a flowchart illustrating the operation of the encoder apparatus 100 and a preferred embodiment of the encoder portion of the low-frequency removal method of the present invention. As shown in FIG. 7A, at step 200, an image frame is received for compression, organized into sub-matrices of pixels, and each sub-matrix is converted to an input vector IV. As mentioned previously, in the preferred embodiment, the input vectors are 4×4 quincunx vectors. Next, at step 202, the calculator 104 computes the mean value of each IV and stores the mean value in the memory 106. Additionally, as shown at step 203, the mean values are provided to the transmitter for transmission to a plurality of reception sites.

At step 204, an initial (current) IV is selected for consideration. Next, at step 206, a low-frequency component vector ($LF=LF_0+M_{LF}$) is obtained for the current IV by applying the interpolating LPF 114 to the required mean values. As mentioned previously, to construct the LF, the interpolating LPF requires the mean value of the current IV under consideration as well as the mean values of all IV's adjacent the current IV. Once LF has been constructed, a measure of difference is obtained between the current IV and LF, as shown at step 208. As mentioned, any suitable measure of difference may be employed, such as for example, a least-squares measure.

Next, at step 210, the measure of difference between IV and LF is compared to a threshold value to determine whether there is a significant difference between IV and LF, i.e., whether LF alone is a sufficient approximation to IV. As described previously, this will be the case with "shade" input vectors. If the measure of difference is less than the threshold, then no further processing will be performed on the current IV. Thus, control passes to step 212 where a "mean only" code is provided to the transmitter for transmission to the decoder to alert the decoder that the current IV may be sufficiently approximated by its low-frequency component vector LF. As will be described hereinafter, a decoder at a reception site, upon receiving the "mean only" code for a particular input vector, will reconstruct the LF of that input vector from the requisite mean values it receives from the encoder, and will use the LF alone as a representation of that input vector.

If, however, at step 210 the measure of difference exceeds the threshold, then control passes to step 216. At step 216, the low-frequency component vector LF is subtracted from the current input vector IV to obtain a low-frequency removed vector LFRV. As those skilled in the art will appreciate, the low-frequency removed vector LFRV will contain the high-frequency detail of the current IV under consideration. As mentioned in the background, this method of low-frequency removal is known in the art, and the use of the low-frequency component as an approximation to "shade" vectors at the decoder has the advantage of reducing "blocking" effects since a smoother transition at vector boundaries is achieved.

The low-frequency removed vector can be expressed as follows:

$$LFRV=IV-LF=IV_0-LF_0+M-M_{LF}.$$

As can be seen, the LFRV contains a zero-mean vector term ($IV_0-LF_0$) and a scalar d.c. offset term ($M-M_{LF}$) which represents the mean value of the LFRV. The introduction of this d.c. offset term is a disadvantage in the prior art, because the VQ codebook and quantizer must deal with the d.c. offset, resulting in a more difficult VQ process. The present invention overcomes this disadvantage by removing the d.c. offset term from the LFRV and discarding it while allowing full recovery of the input vector at the decoder without increasing the amount of data needed at the decoder for reconstruction.

Thus, following the flowchart to FIG. 7B, at step 218, the mean value (d.c. offset) of the LFRV (MVLFRV) is computed by calculator 138. As shown at step 220, the MVLFRV can be expressed as: $M-M_{LF}$ where M is the mean value of the current IV under consideration and $M_{LF}$ is the mean value of the corresponding LF obtained in step 206. At step 222, the MVLFRV is subtracted from the LFRV thereby removing the d.c. offset term and producing a residual vector RV having a zero mean, as shown at step 224. The residual vector RV can be expressed mathematically as follows:

$$RV=IV_0-LF_0,$$

where $IV_0$ represents the zero-mean component of the current IV, and $LF_0$ represents the zero-mean component of the LF obtained at step 206.

Next, at step 226, vector quantization is performed on RV and a residual codevector RC is selected from the codebook 146 that most closely resembles RV. The selection of RC produces the address of RC (RCA), as shown at step 228. At step 230, the RCA is transmitted to the reception sites by the transmitter. Control then passes to step 232.

At step 232, it is determined whether the current IV is the last IV of the current image frame; that is, whether each IV in the current image frame has been compressed. If the current IV is not the last IV in the current image frame, then the next IV is selected, at step 234, and control passes back to step 206 where the process described above is performed on that IV. If, however, it is determined in step 232 that the current IV is the last IV in the current frame, control passes back to step 200 where the next image frame is received for processing.

As can be seen from the foregoing discussion, for each image frame, the data transmitted to the reception sites comprises the mean value of each IV and an RCA or "mean only" instruction for each IV. As those skilled in the art will appreciate, no increase in the amount of transmitted data occurs as a result of removing the d.c. offset from each LFRV in step 222. Yet, as will become evident hereinafter, each IV may be fully reconstructed at a reception site using only the transmitted information, despite removal and discarding of the d.c. offset.

FIGS. 8-13 provide further detail of the interpolating low-pass filter 114 of FIG. 5. The filter 114 is a two-dimensional filter whose frequency response can be expressed generally as:

$$R(j\omega) = \sum_{m=-p}^{p} \sum_{n=-q}^{q} A_{m,n}(e^{j(mWxDx+nWyDy)} + e^{-j(mWxDx+nWyDy)})$$

Where:
Wx, Wy are horizontal and vertical radian frequencies respectively;
Dx, Dy are the horizontal and vertical pixel or sample separations; and
$A_{m,n}$ are the array coefficients of the filter.

The array coefficients $A_{m,n}$ of a preferred filter 114 are illustrated graphically in FIG. 8. As is illustrated, in the preferred embodiment, the two-dimensional filter 114 displays opposite quadrant symmetry, and therefore, $A_{m,n}$ is equal to $A_{-m,-n}$. Thus, the frequency response of the filter 114 can be simplified to:

$$R(j\omega) = \sum_{m=0}^{p} \sum_{n=0}^{q} A_{m,n}(\cos(m\theta + n\phi))$$

Where:
$\theta = WxDx = 2\pi f_x Dx$;
$\phi = WyDy = 2\pi f_y Dy$; and
$f_x, f_y$ are the horizontal and vertical spatial frequencies, respectively.

Figure 9:
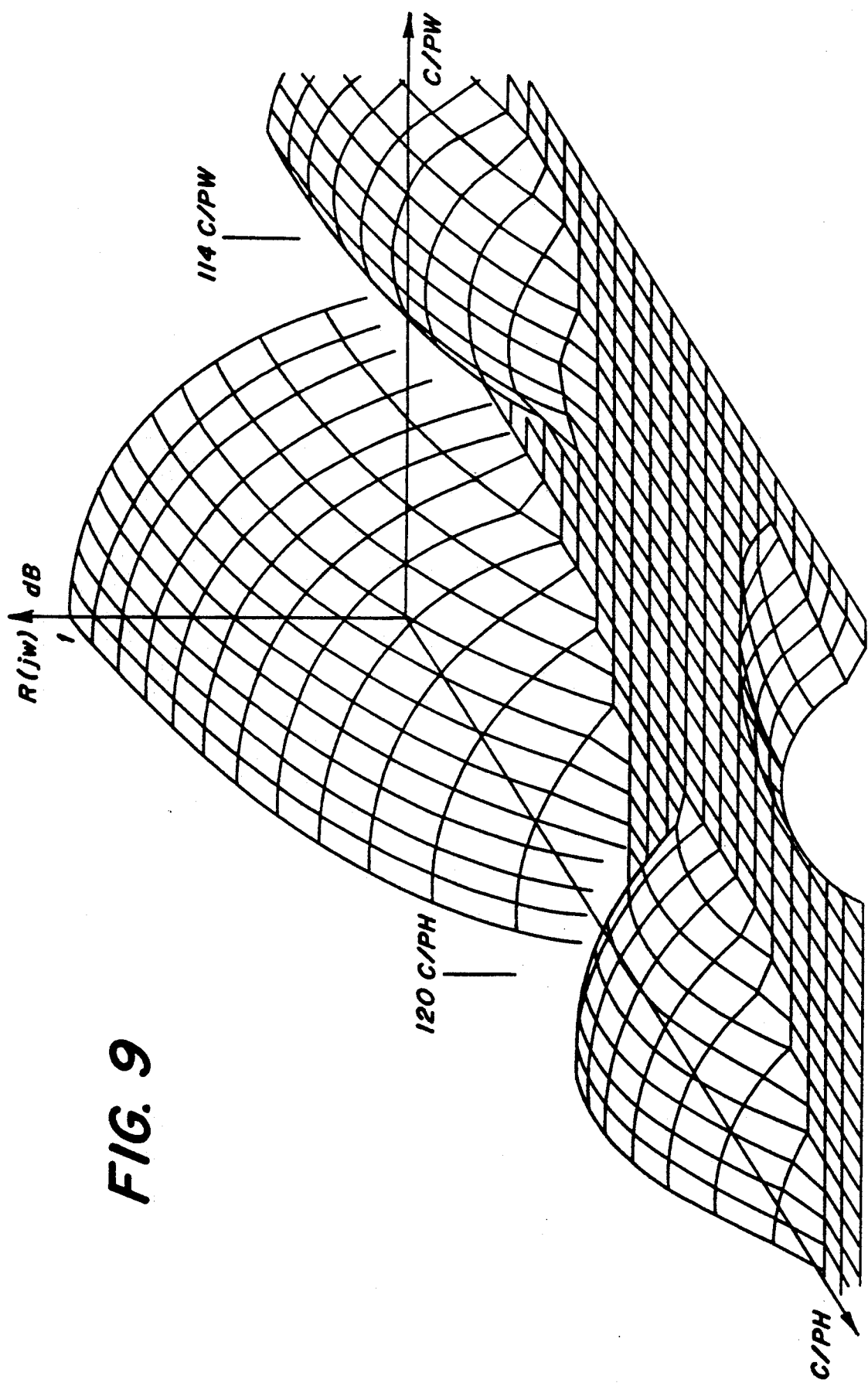
FIG. 9 is a plot of the frequency response of the preferred implementation of the two-dimensional interpolating low-pass filter of FIG. 8.

The two-dimensional frequency response R(jw) of the filter 114 is plotted in FIG. 9 in decibels versus horizontal (cycles/picture width) and vertical (cycles/picture height) spatial frequencies.

It is understood that FIGS. 8 and 9 merely illustrate the array coefficients $A_{m,n}$ and frequency response R(jw), respectively, of a preferred interpolating low-pass filter 114 for use in accordance with the method and apparatus of the present invention. As is known in the art, two-dimensional interpolating low-pass filters, such as filter 114, may be implemented in a variety of ways with various frequency response characteristics. Accordingly, the filter 114 is not limited to the characteristics illustrated in FIGS. 8 and 9, and it is understood, therefore, that any further description of the details of the filter 114 are not intended to be limiting.

As mentioned in the background, interpolating low-pass filters, such as the filter 114, are applied to sub-samples of the image frame in order to generate a low-frequency component of the original image frame. According to the present invention, the "sub-samples" used with the filter 114 are the scalar mean values of the input vectors of the image frame. Specifically, for each IV, the filter 114 is applied to the mean value of that IV and the mean value of the IV's adjacent that IV, to generate a low-frequency component vector LF which is an approximation to a low-pass version of that IV. The mean value of a quincunx vector, such as an input vector, is effectively "located" at the centroid of the vector. Consequently, the frequency response of the interpolating filter 114 is centered at the centroid of a given quincunx vector.

Figure 10:
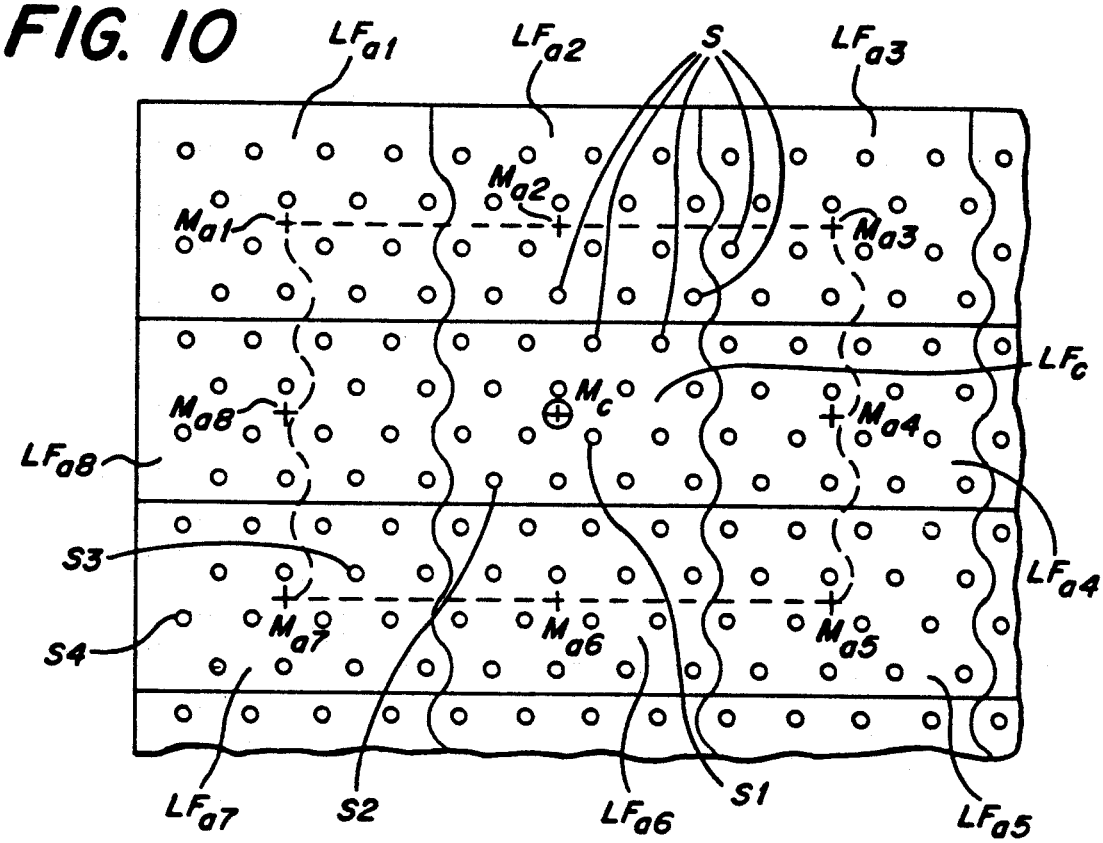
FIG. 10 graphically illustrates the application of the two-dimensional interpolating low-pass filter of FIGS. 8 and 9 to a plurality of input vector mean values for constructing a low-frequency component vector.

As mentioned, the filter 114 is applied to the mean value of a current IV and the mean value of the IV's adjacent the current IV, to generate a low-frequency component vector LF which is an approximation to a low-pass version of the current IV. FIG. 10 graphically illustrates the application of the filter 114 to the mean value $M_c$ of a current IV under consideration. As shown, the influence of the filter 114 spreads over each sample (S) in the low-frequency component vector $LF_c$ for the current IV, as well as the samples in portions of each of the low-frequency component vectors $LF_{a1}...a8$ for adjacent input vectors. The coefficient values (illustrated in FIG. 8) of the filter 114 will determine the weighted contribution that mean value $M_c$ will make to each sample value S within the area of influence illustrated by the dashed-line. For example, referring to FIGS. 8 and 10 together, $M_c$ contributes to low-frequency component sample value S1 in the low-frequency component vector $LF_c$ in the proportion 105/128, and contributes to low-frequency component sample value S2 in $LF_c$ in the proportion 55/128. Similarly, $M_c$ contributes to the low-frequency component sample value S3 in the adjacent low-frequency component vector $LF_{a7}$ in the proportion 3/128. However, because sample value S4 in $LF_{a7}$ is outside the influence of the filter 114 when centered on $M_c$, $M_c$ does not contribute to its value.

Those skilled in the art will appreciate that, in constructing the complete low-frequency component vector $LF_c$ (i.e. calculating the value of each sample S in the vector) for the current IV under consideration, in addition to applying the filter 114 to $M_c$, the filter will be applied to each of mean values $M_{a1}...a8$ of the IV's adjacent the current IV to determine their contribution to the total value of each sample in $LF_c$. Thus, the filter 114 will be centered on each mean value $M_{a1}...a8$, and as in the examples above, the contribution that each mean value makes to each sample in $LF_c$ will be determined according to the filter coefficients $A_{n,m}$. The final value of each sample S in $LF_c$ is determined by summing the weighted contributions of each mean value $M_{c,a1}...a8$ to that sample S. Once the final value of each sample S in $LF_c$ is determined, the vector is complete (step 206, FIG. 7a) and may be compared to the corresponding current IV (steps 208, 210, FIG. 7a) and if need be, subtracted from the current IV (step 216, FIG. 7a).

As explained above, the mean value of the current IV under consideration and the mean value of each IV adjacent the current IV are needed to construct the low-frequency component vector LF for the current IV. However, only four of those mean values contribute to any one sample in LF; that is, the final value of each sample S in the low-frequency component vector LF depends upon only four of the mean values. This concept is illustrated graphically in FIG. 11. In the figure, each sample S within the rectangle R that joins the mean values $M_{11...22}$ (located at the centroids of their respective vectors) may be determined by summing the weighted contribution (according to the filter coefficients $A_{m,n}$) of each of those mean values.

As can be seen, the four mean values $M_{11...22}$ may be employed to determine the final sample values in one quadrant of each of the low-frequency component vectors $LF_{1...4}$. Thus, for example, when constructing the low-frequency component vector $LF_1$ for a current IV under consideration, only the sample values S in the lower-left quadrant of $LF_1$ are determined by the mean values $M_{11...22}$. Thus, as mentioned above, the mean values of the current IV under consideration and all adjacent IV's are needed to determine the final sample values for the entire vector $LF_1$; again, however, only four of those values are needed to determine the final value of any one sample.

Figure 11:
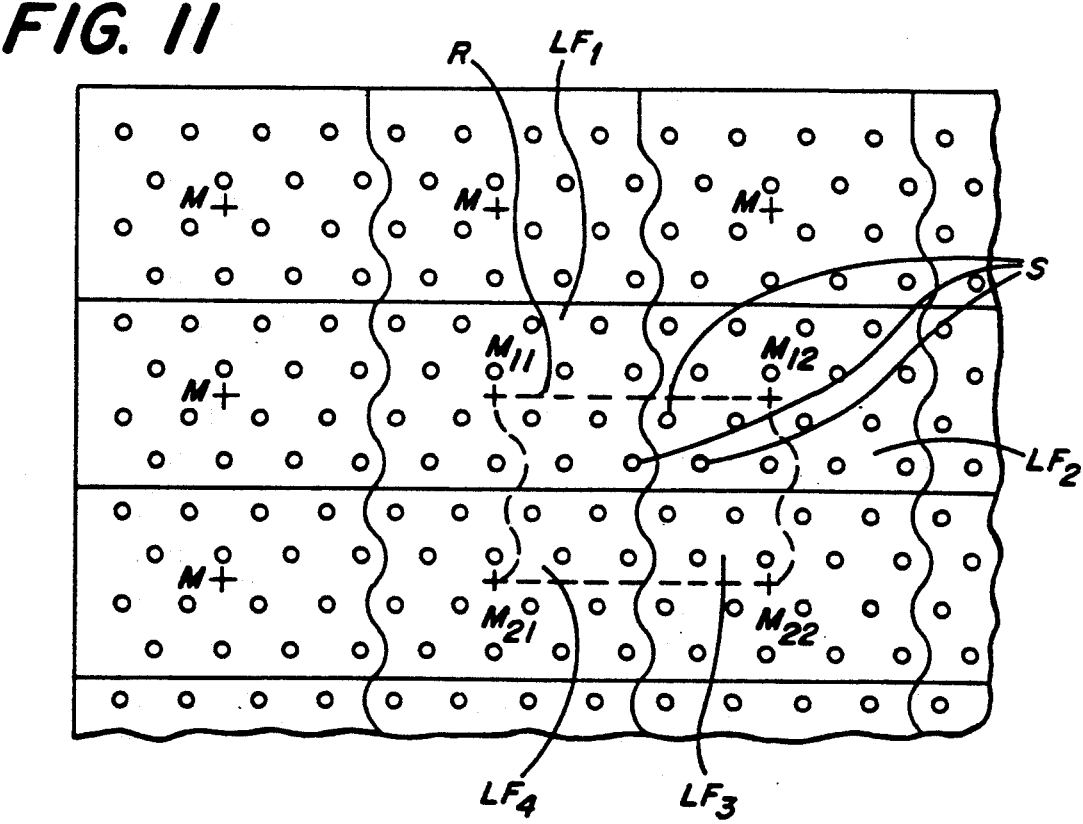
FIG. 11 graphically illustrates further details of the application of the two-dimensional interpolating low-pass filter of FIGS. 8 and 9 to four input vector mean values for determining the individual low-frequency sample values in a rectangular area bounded by the four mean values.

Referring now to FIG. 12, the rectangular area R of FIG. 11 is shown in greater detail along with a mathematical expression for determining the final value $LF[n,m]$ of each sample S within the rectangle R. As the expression for $LF[n,m]$ indicates, the final value of each sample S is the weighted sum of the four mean values $M_{11...22}$. For example, the final value of the sample S1, with coordinates n=3, m=7, in the lower-left quadrant of $LF_1$ is:

$$S1 = LF[3,7] = (105/128)M_{11} + (15/128)M_{21} + (7/128)M_{12} + (1/128)M_{22}$$

Similarly, the final values of each other sample S are determined by applying the coordinate values (n,m) of those samples to the equation.

Figure 13:
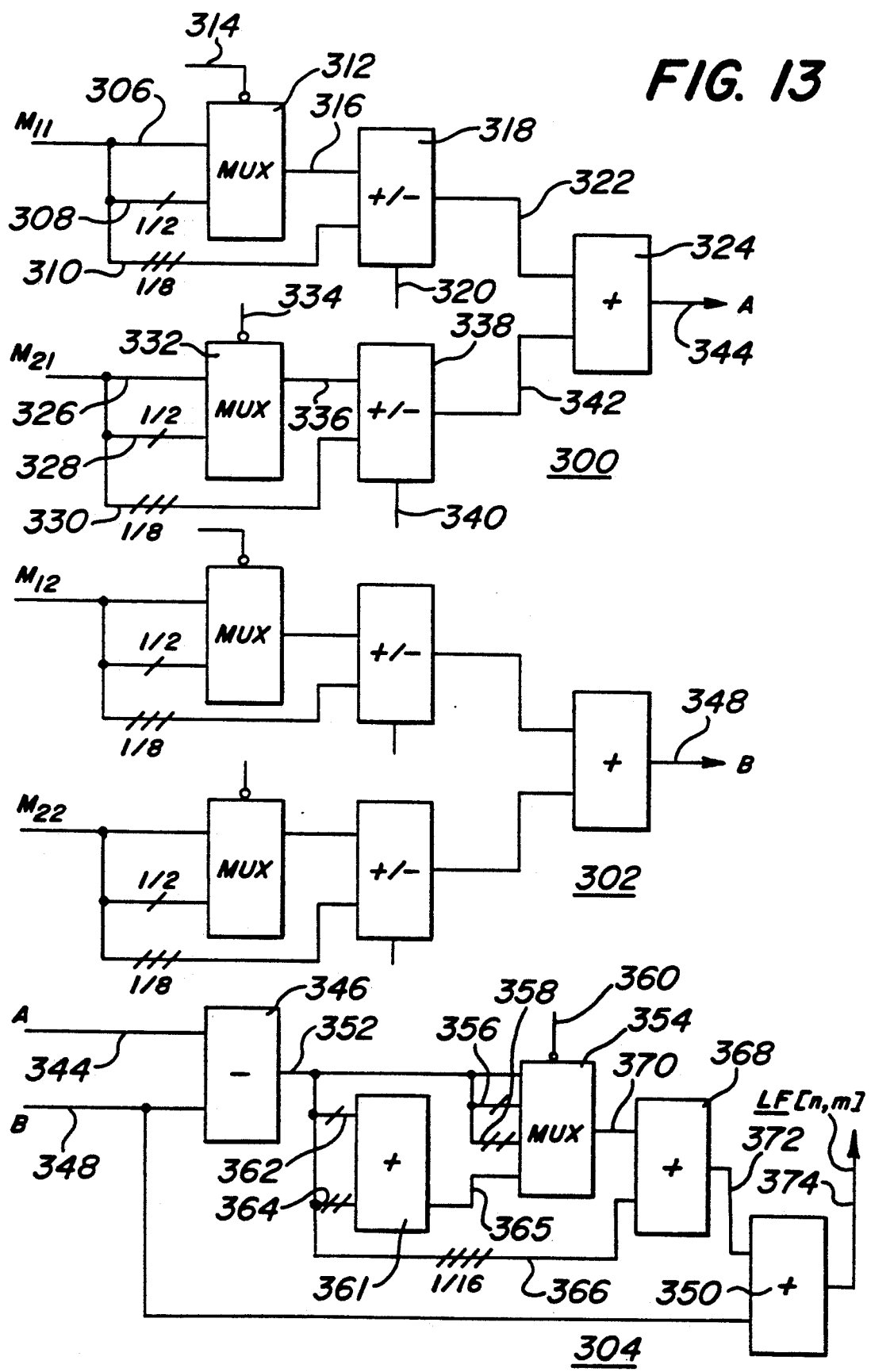
FIG. 13 is a block diagram of one implementation of the two-dimensional interpolating low-pass filter of FIGS. 8 and 9.

FIG. 13 is a block diagram of a hardware implementation of the filter 114. Essentially, the logic of FIG. 13 implements the equation of FIG. 12 for determining a given low-frequency component vector sample $LF[n,m]$. As seen in FIG. 13, the hardware implementation comprises three modules 300, 302 and 304. Considering module 300 first, mean value $M_{11}$ is provided to each of two inputs of a multiplexor 312 via lines 306 and 308 respectively. As indicated by the single "/" on line 308, $M_{11}$ is multiplied by 1/2 before reaching the respective input of the multiplexor 312. The output of the multiplexor 312, which is controlled by a signal on a line 314, is provided to one input of an adder/subtractor circuit 318 via a line 316. The mean value $M_{11}$, after being multiplied by ¼ (as indicated by the three "/"s— each "/" indicating multiplication by ½) is provided to the other input of the adder 318 via a line 310. Depending upon a signal on line 320, the circuit 318 either adds the two values at its inputs, or subtracts the input provided on line 316 from the input provided on line 310. The output of the adder/subtractor 318 is provided to one input of an adder circuit 324 via a line 322.

In a similar manner, $M_{21}$ is provided to each of two inputs of a multiplexor 332 via lines 326 and 328 respectively. As indicated by the single "/" on line 328, $M_{11}$ is multiplied by 1/2 before reaching the respective input of the multiplexor 332. The output of the multiplexor 332, which is controlled by a signal on a line 334, is provided to one input of an adder/subtractor circuit 338 via a line 336. The mean value $M_{11}$, after being multiplied by ¼ (as indicated by the three "/"s—each "/" indicating multiplication by ½) is provided to the other input of the adder 338 via a line 330. Depending upon a signal on line 340, the circuit 338 either adds the two values at its inputs, or subtracts the input provided on line 336 from the input provided on line 330. The output of the adder/subtractor 338 is provided to the other input of the adder circuit 324 via a line 342. The adder 324 adds the values provided on lines 322 and 342, and provides the sum, via a line 344, to one input of a subtractor circuit 346 in the module 304.

Module 302 is identical to module 300 described above except that it operates on mean values $M_{12}$ and $M_{22}$, to provide a result, on a line 348, to the other input of the subtractor 346 of module 304. The result of module 302 is also provided via line 348 to one input of an adder circuit 350.

Referring now to module 304 of FIG. 13, the output of the subtractor 346 is provided, via a line 352, to one input of a 4-to-1 multiplexor 354. Two other inputs of multiplexor 354 receive, via lines 356 and 358, the output of subtractor 346 multiplied by ¼ and ¼, respectively. The output of subtractor 346 is further provided, after being multiplied by ¼, to one input of an adder circuit 361 via a line 362. A second input of the adder circuit 361 receives, via a line 364, the output of subtractor 346 multiplied by ¼. The adder 361 sums the values on lines 362 and 364 and provides the result, on a line 365, to a fourth input of the 4-to-1 multiplexor 354. The output of the multiplexor 354, which is determined by a control signal on a line 360, is provided to one input of an adder circuit 368 via a line 370. A second input of the adder circuit 368 receives, via a line 366, the output of the subtractor 346 multiplied by 1/16.

The output of adder 368 is provided, on a line 372, to a second input of adder 350. The adder 350 sums the values on lines 372 and 348 and provides a result on a line 374. As those skilled in the art will appreciate, depending on the coordinates (n,m) of a given sample S in FIG. 12, control signals provided to the 2-to-1 multiplexors (e.g., 312, 332) and adder/subtractor circuits (e.g. 318,338) of modules 300 and 302, and the control signal provided on line 360 to the 4-to-1 multiplexor 354 of module 304, will select the proper circuit configuration such that the output on line 374 is the proper weighted sum of the four mean values $M_{11...22}$ for that sample S. In this manner, a low-frequency component vector LF for a current IV under consideration can be determined sample-by-sample. Line 374 may be the line 119 which feeds the LF register 120 in FIG. 119. Thus, each sample of a given LF is individually determined and stored in register 120 until the entire vector is complete.

As mentioned above, the details of filter 114 provided above, describe one preferred implementation of the filter, and are not intended to be limiting. Any two-dimensional interpolating low-pass filter may be employed without deviating from the spirit and scope of the present invention.

According to the method of the present invention, the compressed VQ data transmitted from the encoder 100 is received at a plurality of reception sites, each of which may employ a decoder apparatus for reconstructing the image frame. As previously mentioned, the data transmitted from the encoder comprises the mean value of each IV and an RCA or "mean only" instruction for each IV. The decoder reconstructs each IV from the transmitted data in order to re-create the image frame at the reception site for display on a television set at the locale of the reception site.

In accordance with the method of the present invention, a second VQ codebook is provided at the decoder. The second codebook is substantially identical to the codebook 146 at the encoder. Also provided at the decoder is a second two-dimensional low-pass filter which is substantially identical to the filter 114 at the encoder.

At the decoder, the transmitted mean value M of each input vector IV is received and stored. The stored mean values will be available to the second two-dimensional interpolating low-pass filter for reconstructing the low-frequency component vectors LF for each input vector IV. The transmitted RCA or "mean only" code for each input vector is also received and stored at the decoder.

For each received RCA, the codevector residing at the RCA in the decoder codebook is retrieved from the codebook. The retrieved codevector will be substantially identical to the residual codevector selected from the first codebook at the encoder. Thus, the retrieved codevector can be expressed as:

$$RC \approx IV_0 - LF_0.$$

To reconstruct an approximation to the original input vector ($IV = IV_0 + M$), the zero-mean vector $LF_0$ must be reconstructed and added back to RC along with the transmitted mean value M for that IV.

The low-frequency component vector ($LF = LF_0 + M_{LF}$) for the current IV is reconstructed at the decoder using the second interpolating low-pass filter which, as mentioned, is identical to and operates in the same manner as the filter 114 described above. Because only the zero-mean component $LF_0$ is needed, the mean value $M_{LF}$ of LF must be (and is) determined and subtracted from LF to obtain the zero-mean component $LF_0$. The zero-mean component $LF_0$ is then added to RC along with the corresponding input vector mean value M to produce a representation RIV of the original IV. Thus, $$\begin{aligned} RIV &= RC + LF_0 + M \\ &= (\approx IV_0 - LF_0) + LF_0 + M \\ &\approx IV_0 + M \end{aligned}$$

In the case where a "mean only" instruction code is received for a given IV, rather than an RCA, the reconstructed low-frequency component vector LF is used as an approximation to that IV. Thus, in such a case, $M_{LF}$ is not subtracted from the reconstructed vector LF.

Each IV reconstructed at the encoder can then be employed to substantially re-create the image frame for display on a television set at the locale of the decoder.

Figure 14:
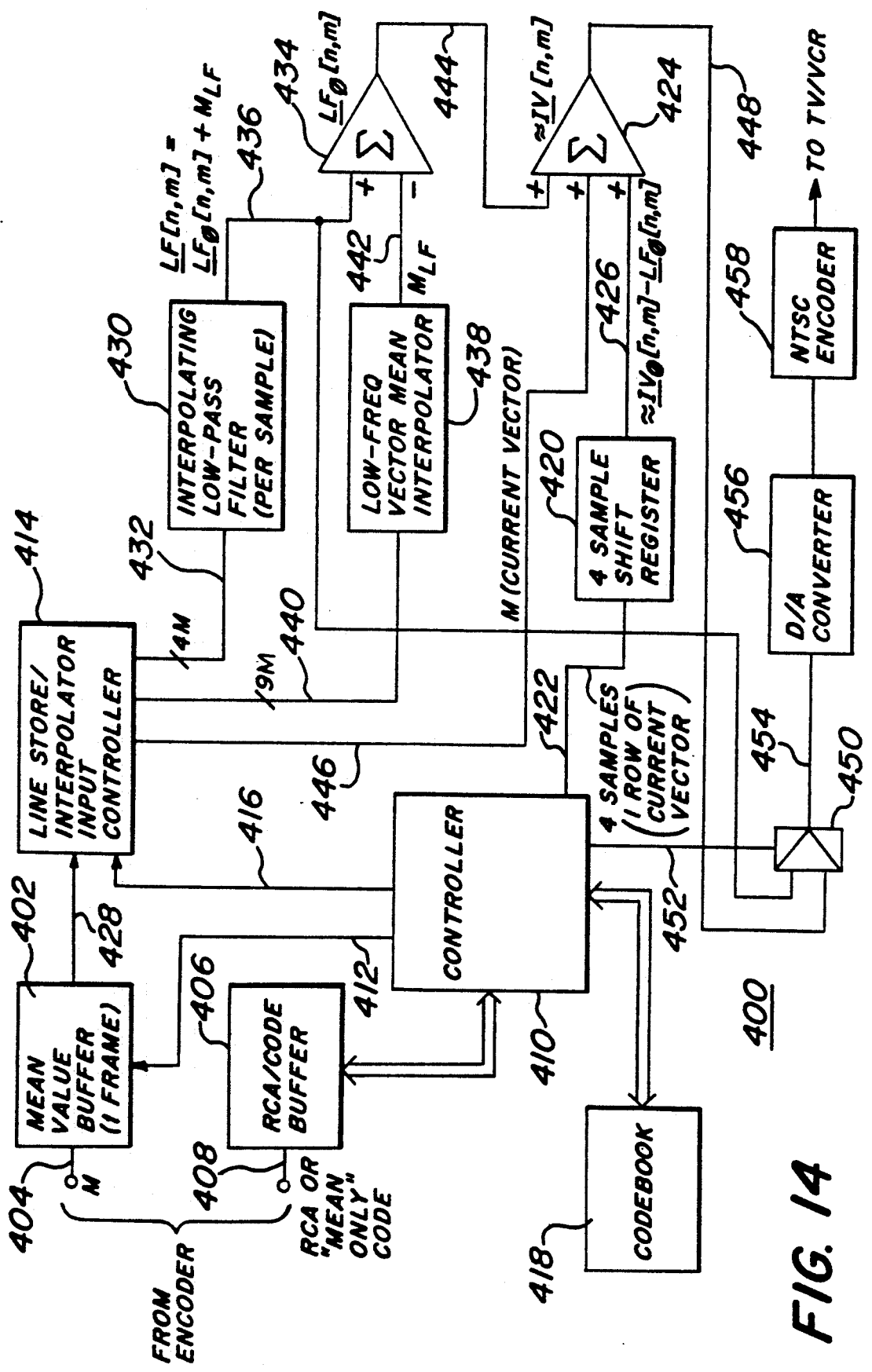
FIG. 14 is a block diagram of a preferred embodiment of a decoder apparatus for carrying out the decoder portion of the low-frequency removal method of the present invention.

FIG. 14 is a block diagram of a preferred embodiment of a decoder apparatus 400 for carrying out the decoder portion of the low-frequency removal method of the present invention. The decoder apparatus 400 of FIG. 14 may be employed at each reception site, and specifically may be employed to implement blocks 36 and 44 of Figures 1 and 2 respectively. Referring to FIG. 14, the mean values transmitted from the encoder are received by a receiver (not shown) and provided to a mean value buffer 402 via a line 404. The RCAs or "mean only" codes for each IV are received and provided to an RCA/code buffer 406 via a line 408. No further processing occurs until all mean values and RCA's (or "mean only" codes) for the current image frame have been received and stored in the buffers 402, 406 respectively. Thus, each buffer holds data for an entire image frame.

Figure 17:
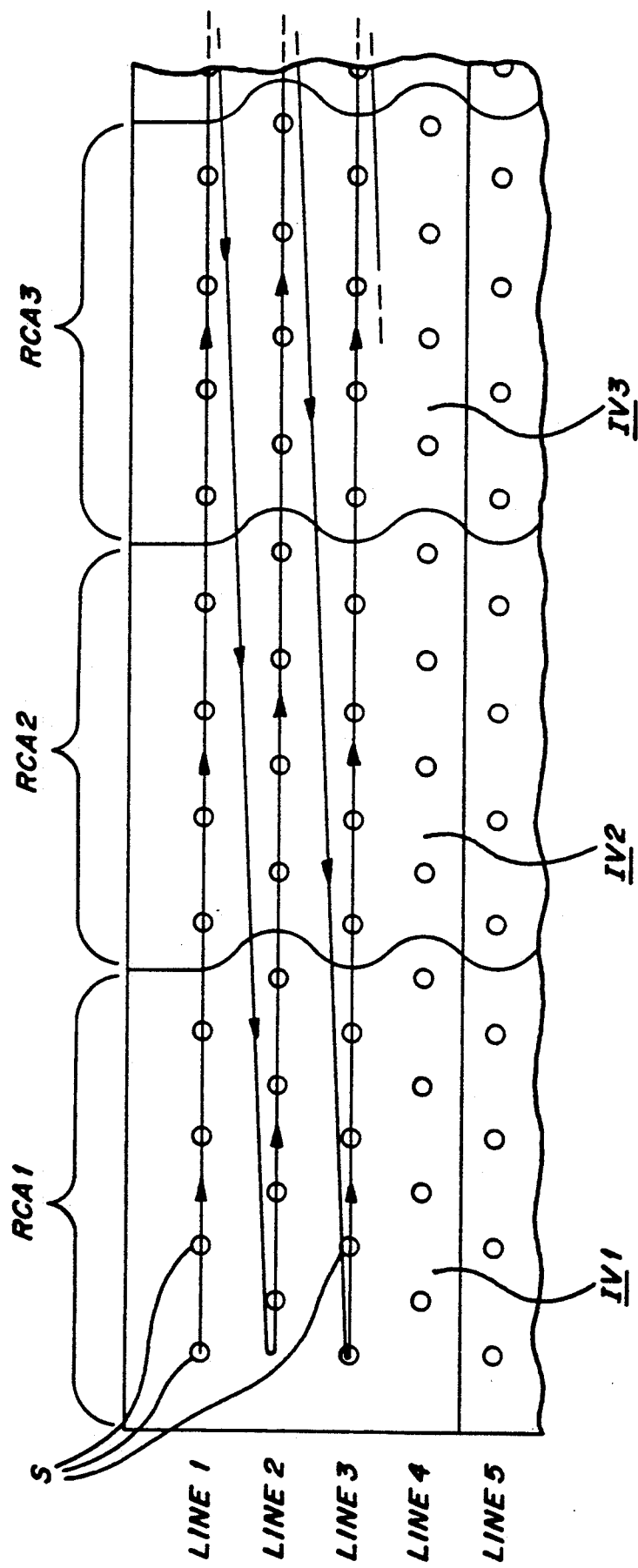
FIG. 17 graphically illustrates further details of the method and apparatus of FIGS. 14, 16A and 16B.

Before proceeding with the description of the decoder 400, it is helpful to describe the manner in which individual pixel (sample) information is transmitted to a display device. Referring to Figure 17, a portion of a reconstructed image frame to be displayed is shown. As can be seen, the image frame comprises a plurality of horizontal lines of video samples or pixels. These lines of pixels (samples) are generally referred to as horizontal scan lines. As also shown in the figure, each row of input vectors, e.g. $IV_1$, $IV_2$, $IV_3$..., forms four of the horizontal scan lines, since each input vector contains four rows of pixels. To display the image frame, the individual pixels or video samples S will be transmitted to the display device in the order shown by the arrows; that is, starting from the upper left corner of the image, the samples S will be transmitted from left to right, one scan line at a time.

As those skilled in the art will appreciate, if the decoder is designed to reconstruct an entire row of input vectors at a time (e.g. $IV_1$, $IV_2$, $IV_3$...), it will be reconstructing four horizontal scan lines at a time. Thus, the decoder would have to provide real-time storage for these lines prior to transmitting them to the display device. Providing real-time storage of video signals is disadvantageous, and therefore, a better design would allow the decoder to reconstruct input vectors one line at a time. For example, referring to horizontal scan line$_1$ of FIG. 17, the decoder would only reconstruct the four pixels in the top row of each input vector $IV_1$, $IV_2$, $IV_3$..., transmitting each reconstructed sample as it is created. After completing horizontal scan line$_1$, the decoder would then go back to the left side of the image and begin reconstructing the four pixels in the second line of each input vector $IV_1$, $IV_2$, $IV_3$..., transmitting each of those reconstructed pixels (samples) as they are created. As those skilled in the art will appreciate, this latter method does not require real-time storage of video signals. However, the method does require the decoder to have the ability to reconstruct each input vector one pixel (sample) at a time. As will become evident hereinafter, the decoder 400 of FIG. 14 has these capabilities.

Referring once again to the decoder apparatus 400 of FIG. 14, a controller 410 bi-directionally communicates with the buffer 406 for retrieving the RCA or "mean only" code for a current IV under consideration. The controller also provides address data to the mean value buffer 402, via a line 412, and control data to a line store/interpolator input controller 414, via a line 416.

In the case where an RCA (rather than a "mean only" code) has been transmitted to the decoder 400 for a current IV under consideration, the controller bi-directionally communicates with a codebook 418 for retrieving the residual codevector ($RC = IV_0 - LF_0$), residing at the RCA, from the codebook 418. The codebook 418 may be identical to the codebook 146 of the encoder 100. As just explained, the decoder 400 must reconstruct one row of the current IV; i.e., the row that corresponds to the current horizontal scan line. Thus, the controller 410 provides a row (4 samples) of the retrieved RC, corresponding to the current horizontal scan line, to a register 420 via a line 422. The register 420 sequentially provides each sample RC[n,m] to an adder 424 via a line 426. Each sample RC[n,m] can be expressed as follows: $RC[n,m] = IV_0[n,m] - LF_0[n,m]$. In order to reconstruct each sample IV[n,m] in the row of IV corresponding to the current scan line, the low-frequency component vector sample $LF_0[n,m]$ must be obtained and added to the corresponding sample RC[n,m] along with the mean value M of the IV. That is, $IV[n,m] = RC[n,m] + LF_0 + M$ Accordingly, for a given sample IV[n,m] being reconstructed, the input controller 414 obtains the stored mean values for that IV and all IV's adjacent the current IV from the buffer 402 via a line 428 (actually the interpolator input controller 414 receives entire lines of mean values ahead of time, and temporally stores them until needed). The input controller 414 provides the four mean values M, necessary for reconstructing the corresponding low-frequency component sample LF[n,m], to a two-dimensional interpolating low-pass filter 430 via lines 432. The filter 430 is identical to the filter 114 of the encoder, and as described in detail previously, interpolates LF[n,m] from the four mean values. The interpolated sample LF[n,m] is provided to the "+" input of an adder circuit 434, via a line 436.

As mentioned above, to reconstruct IV[n,m], the zero-mean low-frequency sample value $LF_0[n,m]$ must be obtained. Therefore, the mean value $M_{LF}$ of the entire vector LF must be determined and subtracted from the individual sample LF[n,m] produced by filter 430. However, as mentioned, the decoder cannot wait to determine the entire vector LF and then calculate its mean value $M_{LF}$. $M_{LF}$ must be available for each individual sample LF[n,m] immediately after the sample is created by the filter 430. Fortunately, as will be described in greater detail hereinafter, the mean value $M_{LF}$ may be interpolated from the same mean Values (i.e., the mean value of the current IV and all adjacent IV's) used by the filter 430, thereby avoiding the need to construct the entire vector LF in order to determine $M_{LF}$. Thus, as shown in FIG. 14, a low-frequency component vector mean interpolator 438 (details provided hereinafter) receives the mean value of the current IV and of all IV's adjacent the current IV via lines 440 and supplies an interpolated value $M_{LF}$, via a line 442 to the "−" input of the adder circuit 434.

The adder 434, subtracts $M_{LF}$ from the sample LF[n,m] to provide, on a line 444, the zero-mean low-frequency component vector sample value $LF_0[n,m]$. The sample value $LF_0[n,m]$ is provided via line 444 to a second "+" input of adder 424. The mean value M of the current IV under consideration is also provided to the adder 424, via a line 446 from the input controller 414. The adder 424 adds RC[n,m] (provided via line 426 from the register 420), the corresponding low-frequency sample $LF_0[n,m]$, and the mean value M of the current IV, to provide, on a line 448, a representation(reconstruction) of the current IV sample IV[n,m]. This reconstruction is performed for each of the four samples RC[n,m] stored in the register 420. Thus, the decoder 400 reconstructs the four samples (one row) of the current IV that comprise a portion of the current horizontal scan line.

The reconstructed samples IV[n,m] are then sequentially provided via line 448 to one input of a multiplexor 450 whose output is controlled via a line 452 from the controller 410. When properly selected, the sample values IV[n,m] pass through to the output of the multiplexor 450 and are provided via a line 454 to a D/A converter 456 which converts the samples to analog form for NTSC encoding by encoder 458. The NTSC encoded samples are then transmitted, from left to right, to a device, such as a television or VCR, for display or recording.

In the case where a "mean only" code is transmitted to the decoder 400, however, the decoder 400 approximates each sample IV[n,m] by its corresponding low-frequency component vector sample LF[n,m] (without removing $M_{LF}$). Thus, the sample value LF[n,m] is provided directly to another input of the multiplexor 450. The controller 410 selects this input (via line 452) when a "mean only" code is received, allowing the four sample values LF[n,m], corresponding to the given row of the current IV, to be transmitted to the display device as an approximation to IV.

Figures 15A, 15B:
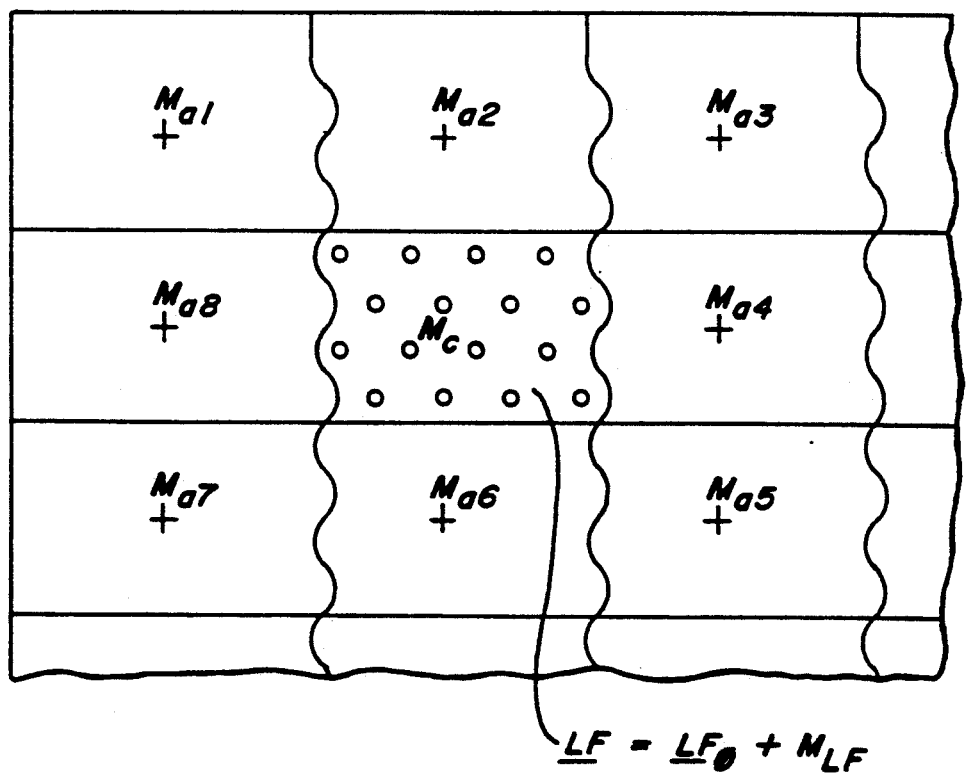
FIGS. 15A-B illustrate further details of the low-frequency component vector mean value interpolator of FIG. 14.

Referring now to FIGS. 15A and 15B, further details of the low-frequency component vector mean value interpolator 438 of FIG. 14 are provided. As mentioned, the mean value $M_{LF}$ of a low-frequency component vector LF for a current IV under consideration is itself a function of the mean value of the current IV and of all adjacent IVs. Therefore, it is possible to determine $M_{LF}$ without having to first construct the entire vector LF; $M_{LF}$ may be interpolated from the mean value of the current IV and of all adjacent IV's. FIG. 15A graphically illustrates the array coefficients for the low-frequency mean value interpolator 438 of FIG. 14. Applying this filter to the mean value of the current IV under consideration and the mean values of all IV's adjacent the current IV will produce the scalar mean value $M_{LF}$ of the low-frequency component vector LF for the current IV.

For example, referring to FIG. 15B, the scalar mean value $M_{LF}$ of the low-frequency component vector LF (which would be constructed sample-by-sample by the interpolating filter 430 of FIG. 14) may be determined by applying the interpolator 438, with the coefficients illustrated in FIG. 15A, to the mean value $M_c$ of the current IV under consideration, as well as the mean values $M_{a1} \ldots a8$ of all IV's adjacent the current IV. As those skilled in the art will appreciate, applying the interpolator 438 to those mean values yields the following:

$$M_{LF} = 36(M_c) + 6(M_{a2} + M_{a4} + M_{a6} + M_{a8}) + 1(M_{a1} + M_{a3} + M_{a5} + M_{a7}).$$

Thus, rather than fully constructing LF, determining its mean value $M_{LF}$, and then subtracting $M_{LF}$ from each sample LF(n,m) in LF, the mean value $M_{LF}$, can be determined in advance and subtracted from each sample LF[n,m] immediately after the sample is created by the filter 430. Only with this ability, can a given row of an input vector can be reconstructed sample-by-sample. Those skilled in the art will appreciate that this ability is necessary if the decoder is to transmit horizontal scan lines to a display device without storing real-time video samples. Without this ability, the decoder would have to reconstruct and store four lines of video (i.e., one row of complete IVs) before transmitting each line to the display device.

Figure 16A:
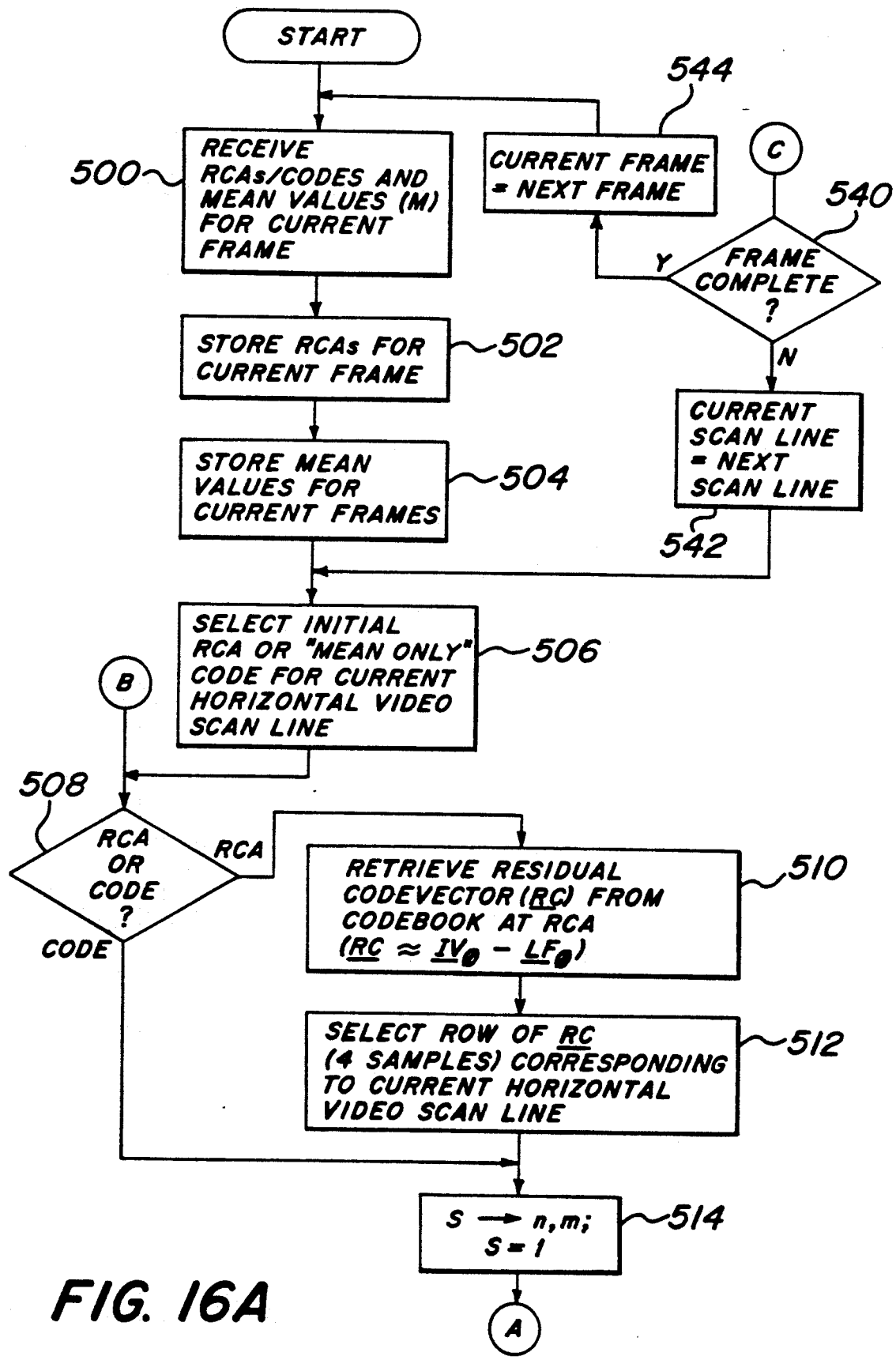
FIGS. 16A-16B are a flowchart illustrating both the operation of the apparatus of FIG. 14 and a preferred embodiment of the decoder portion of the low-frequency removal method of the present invention.
Figure 16B:
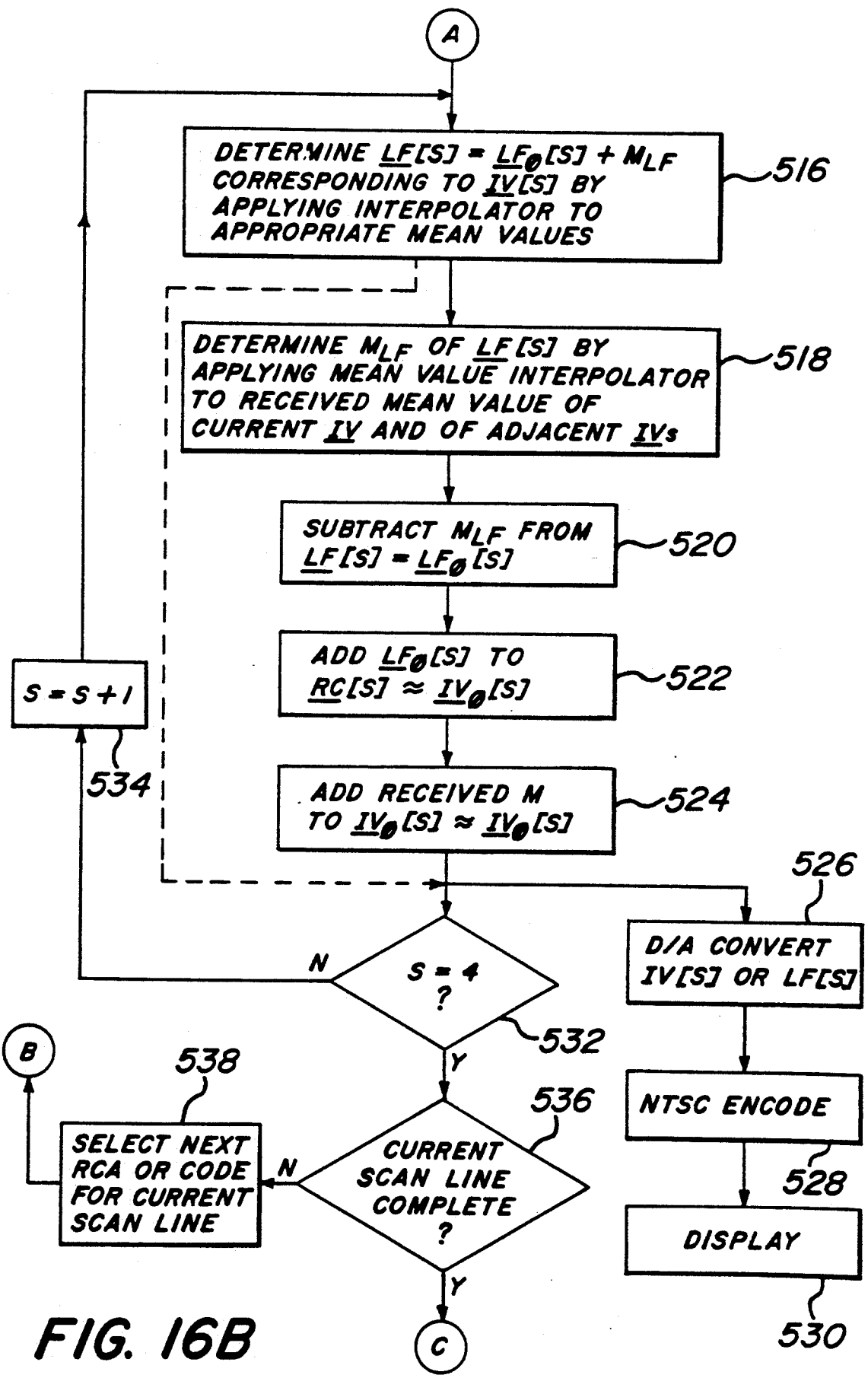

Referring now to FIGS. 16A–16B there is shown a flowchart illustrating both the operation of the decoder apparatus 400 of FIG. 14 and a preferred embodiment of the decoder portion of the low-frequency removal method of the present invention. As shown at step 500, the RCA (or "mean only" code) and the mean value M for each IV in a current image frame are received, and at steps 502 and 504, these values are stored in the buffers 406 and 402 respectively. Next, at step 506, the controller 410 retrieves the RCA or "mean only" code for a current IV under consideration. As described above, one row of the current IV will comprise a portion of the current horizontal scan line being reconstructed for display. Control then passes, to step 508 where the controller 410 determines whether an RCA or "mean only" code has been transmitted to the decoder for the current IV. If the controller determines that an RCA has been transmitted, control passes to step 510, where the residual codevector ($RC = IV_0 - LF_0$), residing at the RCA, is retrieved from the codebook 418. Next, at step 512, the row of RC corresponding to the current horizontal scan line, is selected and stored in the register 420.

Control next passes to step 514 which begins a loop for reconstructing the corresponding four samples of the given row of the current IV. Thus, at step 514, the controller selects the coordinates [n,m] for a first one of the four samples to be reconstructed. For simplicity, the flowchart uses a variable S to denote the coordinates [n,m] for a given sample. Thus, for example, in step 514, S is set equal to 1 indicating that the coordinates [n,m] for the first sample have been selected. Control next passes to step 516, as shown in FIG. 16B. At step 516, the low-frequency component vector sample value LF[S] for the current sample ($S = 1 \rightarrow n,m$) is determined by the filter 430 in the manner described in detail above ($LF[S] = LF_0[S] + M_{LF}$). Next, at step 518, the mean value interpolator 442, in the manner described above, interpolates the value $M_{LF}$ of LF. Then, at step 520, $M_{LF}$ is subtracted from LF[S] to obtain $LF_0[S]$, the zero-mean component of LF[S].

Next, at steps 522 and 524, the adder circuit 424 adds $LF_0[S]$, RC[S], and the mean value M of the current IV to obtain a representation of IV[S] (i.e., $IV[S] = RC[S] + IV_0[S] + M$). The reconstructed sample IV[S] is then converted to analog form (step 526) and NTSC encoded (step 528) for display (step 530). Control next passes to step 532 where it is determined whether all four samples in the current row of IV (i.e., the row corresponding to the current scan line) have been reconstructed. If, not, control passes to step 534 where the coordinates [n,m] for the next sample are determined. Steps 516 through 530 are then repeated for that next sample.

If, however, it is determined in step 532 that all four samples in the current row of IV have been reconstructed, control passes to step 536 to determine whether those four samples were the last four samples of the current scan line. If not, then an RCA or "mean value" code for the IV containing the next four samples of the current scan line is selected from the buffer 406. Control then passes to step 508 where again it is determined whether the retrieved data (i.e. the data transmitted to the decoder for the current IV) is an RCA or "mean only" code. If an RCA was transmitted, then steps 510 to 532 are performed as described above. If, however, a "mean only" code was transmitted, then as mentioned previously, for each sample IV[n,m] to be reconstructed, the corresponding low-frequency component vector sample LF[n,m] is used as an approximation; that is, $IV[n,m] \approx LF[n,m]$. Thus, control passes from step 508 directly to step 514 (no RC is retrieved for this current IV). At step 514, the coordinates ($S \rightarrow [n,m]$) for the first sample of IV to be reconstructed (approximated) are determined and control passes to step 516 where, as before, LF[S] is obtained by the filter 516. However, since LF[S] is to be used to approximate IV[S], control passes from step 516 to steps 532 and 526, as indicated by the dashed line. At step 528, the sample LF[S] (which approximates IV[S]) is converted to analog form and NTSC encoded (step 530) for display (step 530).

Then, at step 532, it is determined whether all four samples have been reconstructed. If not, then the next sample's coordinates are determined at step 534 and control passes back to step 516. Control will proceed as described (i.e., in the manner indicated by the dashed line), until each of the four sample values in the row of the current IV have been approximated by LF[n,m] and displayed. Once all four samples have been reconstructed, control will pass from step 532 to step 536 where again it is determined whether the four samples just processed are the last four samples in the current scan line. If not, control will pass, as described above, to step 538 to begin reconstructing the next four samples in the current scan line.

If, however, at step 536 it is determined that the current scan line is complete, then control passes to step 540 (FIG. 16A). At step 540, it is determined whether the scan line just completed is the last scan line in the image frame. If so, control passes to step 544 where the next image frame is readied for receipt. Next, at step 500, the data for that next image frame is received and the method repeated for that image frame.

If, however, at step 540 it is determined that the currently completed scan line is not the last scan line in the image frame, control passes to step 542 where the next scan line becomes the current scan line. Control then passes to step 506 where the RCA or "mean only" code for the IV containing the first four samples of that scan line is selected and the process described above is repeated for the newly current scan line.

Thus, as the foregoing description illustrates, individual samples of the image frame are reconstructed at the decoder sample-by-sample and transmitted to a display device one scan line at a time. The method is illustrated graphically in FIG. 17. For example, after receiving the RCA's and mean values for a given image frame, the decoder will select $RCA_1$ and obtain from the codebook 418 the residual codevector RC residing at $RCA_1$. The decoder will then select the four samples in the first row of that vector for reconstruction, since those four samples correspond to the first four samples of horizontal scan line$_1$. Each of the four samples in the first row of $IV_1$, moving from left-to-right, will be reconstructed (from RC, $LF_0$ and M) and displayed in turn. The decoder 400 will then select $RCA_2$ and repeat the process to reconstruct the four samples in the first row of $IV_2$. This will continue until horizontal scan line$_1$ is complete. Then, the decoder 400 will re-select $RCA_1$ and again retrieve the residual codevector RC residing at $RCA_1$ from the codebook. However, this time, the decoder 400 will reconstruct the four samples in the second row of $IV_1$ which correspond to the first four samples of horizontal scan line$_2$. From there, the same will be done for the four samples in the second row of $IV_2$, and so on, until horizontal scan line$_2$ is complete. Thus, in this manner, each horizontal scan line in the image frame is reconstructed and displayed, sample-by-sample moving from left-to-right, as indicated by the arrows in FIG. 17.

The invention has been described above as being carried out in the spatial domain, i.e., the codevectors stored in the codebook are representative of the spatial placement of the pixels in each sub-image, and the input vectors used to search the codebook are representative of the spatial placement of an actual group of pixels. However, the invention is not limited to implementation in the spatial domain. The invention may also be carried out in the transform, or frequency, domain wherein, instead of storing spatial codevectors as above described, their transforms are calculated and transformed codevectors are stored in the codebook. For example, each codevector would be replaced by its cosine (Fourier) transform, and each input vector would be transformed prior to searching the codebook. In this case, the codebook would still be constructed as described in the above mentioned Linde et al. reference, but entries would be based upon a distance metric (e.g., mean square error) in the transformed vector space. Thus, in the encoder, the codevector search would be carried out in the transform domain. However, the decoder could remain unchanged. The decoder codebook would continue to operate in the spatial domain. The advantage of this approach is that it is believed that it would result in even less "blocking". The present invention may be employed in other specific forms without departing from the spirit or essential attributes thereof and, accordingly, reference should be made to the appended claims rather than to the foregoing specification, as indicating the scope of the invention.

We claim:

1. In a vector quantization data compression system employing a first vector quantization codebook for compressing an image frame for transmission to a plurality of reception sites, said codebook having a plurality of codevectors, each codevector being representative of a possible residual vector, there being an identification (ID) code associated with each codevector, a method comprising the steps of:
   a) receiving an image frame to be transmitted, organizing the image frame into a plurality of blocks of data, and converting each block to a multi-dimensional input vector;
   b) determining a mean value of each input vector and transmitting at least an indication of each mean value to at least one reception site;
   c) performing the following additional steps for each input vector:
      i) processing at least a portion of said means values to produce a low-frequency component vector representative of a low-pass version of the input vector;
      ii) subtracting the low-frequency component vector produced in step (c)(i) from the input vector to obtain a low-frequency removed vector;
      iii) determining a mean value of the low-frequency removed vector and subtracting the mean value of the low-frequency removed vector therefrom to obtain a residual vector;
      iv) selecting from the first codebook the codevector that most closely resembles the residual vector; and
      v) transmitting at least an indication of the ID code associated with the selected codevector to at least one reception site, said indication representing vector quantized data.

2. Method according to claim 1 wherein the first vector quantization codebook is provided in a memory, and wherein each ID code is a memory address of its associated codevector.

3. Method according to claim 1 wherein step (c)(i) comprises applying a two-dimensional interpolating low-pass filter to said portion of said means values.

4. Method according to claim 1 wherein said portion of said mean values comprises the mean value for the input vector under consideration and at least a portion of the input vectors adjacent the input vector under consideration.

5. Method according to claim 1 wherein the first codebook is a tree-structured codebook having plural levels of codevectors, the codevectors at each successive level representing possible residual vectors with greater accuracy than codevectors at a preceding level.

6. Method according to claim 5 wherein the codevectors are selected from the first codebook according to a distortion adaptive vector quantization algorithm.

7. Method according to claim 1 wherein a second vector quantization codebook, substantially identical to the first vector quantization codebook, is provided at least one reception site, and wherein the following additional steps are performed at the reception site:
   a') receiving the transmitted indications for each input vector and obtaining the mean values and the ID codes therefrom;
   b') performing the following steps to reproduce each input vector at the reception site:
      i) selecting the obtained ID code that was transmitted in step (c)(v) for the input vector;
      ii) retrieving from the second codebook the codevector associated with the obtained ID code to reproduce at least a substantial representation of the codevector selected in step (c) (iv);
      iii) processing at least a first portion of the obtained mean values to produce a low-frequency component vector substantially identical to the low-frequency component vector produced in step (c)(i) for the input vector;
      iv) determining a mean value of the low-frequency component vector produced in step (b')(iii);
      v) subtracting the mean value of the low-frequency component vector produced in step (b') (iii) therefrom to obtain a zero-mean low-frequency component vector; and
      vi) adding the zero-mean low-frequency vector and the obtained mean value for the input vector under consideration to the codevector retrieved in step (b') (ii) to reproduce a substantial representation of the input vector;
   c') employing the input vectors reproduced in step (b') (vi) to substantially re-create the image frame for display on a television set at the reception site.

8. Method according to claim 7 wherein said first portion of said obtained mean values comprises the mean value for the input vector under consideration and the mean values of at least a portion of the input vectors adjacent the input vector under consideration.

9. Method according to claim 7 wherein step (b') (iii) comprises applying a two-dimensional interpolating low-pass filter to said first portion of said obtained mean values.

10. Method according to claim 9 wherein the two-dimensional interpolating low-pass filter applied in step (b') (iii) is substantially identical to the two-dimensional interpolating low-pass filter applied in step (c) (i).

11. Method according to claim 7 wherein step (b') (iv) comprises applying a two-dimensional interpolator to at least a second portion of the obtained mean values, whereby the mean value of the low-frequency component vector produced in step (b') (iii) may be determined without first producing the low-frequency component vector.

12. Method according to claim 11 wherein the second portion of the obtained mean values is substantially identical to the first portion of the obtained mean values.

13. Method according to claim 7 wherein the image frame comprises a matrix of image samples, and wherein each input vector represents a sub-matrix of said matrix of samples, and wherein each input vector is reproduced sample-by-sample, and wherein the image frame is re-created sample-by-sample.

14. Method according to claim 13 wherein the image samples represent pixel values.

15. In a vector quantization data compression system employing a first vector quantization codebook for compressing an image frame for transmission to a plurality of reception sites, said codebook having a plurality of codevectors, each codevector being representative of a possible residual vector, there being an identification (ID) code associated with each codevector, a method comprising the steps of:
   a) receiving an image frame to be transmitted, organizing the image frame into a plurality of blocks of data, and converting each block to a multi-dimensional input vector;
   b) determining a mean value of each input and transmitting each mean value to the reception sites;
   c) performing the following additional steps for each input vector:
      i) processing at least a portion of said mean values to produce a low-frequency component vector representative of a low-pass version of the input vector;
      ii) obtaining a measure of difference between the low-frequency component vector produced in step (i) and the input vector;
      iii) transmitting an instruction to the reception sites to indicate that no further data will be transmitted for the input vector when the measure of difference is less than a threshold value, but otherwise performing the following additional steps (iv) through (vii) for the input vector;
      iv) subtracting the low-frequency component vector produced in step (c) (i) from the input vector to obtain a low-frequency removed vector;
      v) determining a mean value of the low-frequency removed vector and subtracting the mean value of the low-frequency removed vector therefrom to obtain a residual vector;
      vi) selecting from the first codebook the codevector that most closely resembles the residual vector; and
      vii) transmitting at least an indication of the ID code associated with the selected codevector to the reception sites; the indication of the ID code representing vector quantized data;
      whereby vector quantized data for the input vector is not transmitted to the reception sites when the measure of difference obtained in step (c) (ii) is less than the threshold value.

16. Method according to claim 15 wherein the first vector quantization codebook is provided in a memory, and wherein each ID code is a memory address of its associated codevector.

17. Method according to claim 15 wherein the residual codevectors are transformed to a transform domain before being provided in the first codebook, and the codevectors are stored in the codebook in the transform domain, and wherein each residual vector is transformed to the transform domain for selecting one of the codevector from the first codebook.

18. Method according to claim 17 wherein the transform domain is the frequency domain and the codevectors and residual vectors are transformed to the frequency domain by a Fourier transform.

19. Method according to claim 15 wherein the first codebook is a tree-structured codebook having plural levels of codevectors, the codevectors at each successive level representing possible residual vectors with greater accuracy than codevectors at a preceding level.

20. Method according to claim 19 wherein the codevectors are selected from the first codebook according to a distortion adaptive vector quantization algorithm.

21. Method according to claim 15 wherein step (c) (i) comprises applying a two-dimensional interpolating low-pass filter to said portion of said mean values.

22. Method according to claim 21 wherein said portion of said mean values comprises the mean value for the input vector under consideration and the mean values of at least a portion of the input vectors adjacent the input vector under consideration.

23. Method according to claim 15 wherein a second vector quantization codebook, substantially identical to the first vector quantization codebook, is provided at at least one reception site, and wherein the following additional steps are performed at the reception site:
   a') receiving the mean value of each input vector transmitted in step (b) and storing the received mean values of each input vector;
   b') for each indication received at the reception site, obtaining the ID code therefrom and performing the following steps to reproduce, at the reception site, a representation of the input vector that caused the transmission of the indication of the ID code:
      i) retrieving from the second codebook the codevector associated with the obtained ID code to reproduce at least a substantial representation of the codevector selected in step (c) (vi);
      ii) processing at least a first portion of the received mean values to produce a low-frequency component vector substantially identical to the low-frequency component vector produced in step (c) (i) for the input vector;
      iii) determining a mean value of the low-frequency component vector produced in step (b') (ii);
      iv) subtracting the mean value of the low-frequency component vector produced in step (b') (ii) therefrom to obtain a zero-mean low-frequency component vector; and
      v) adding the zero-mean low-frequency component vector and the received mean value for the input vector under consideration to the codevector retrieved in step (b') (i) to reproduce a substantial representation of the input vector;
   c') for each instruction received at the reception site, performing the following step to reproduce, at the reception site, a representation of the input vector that caused the transmission of the instruction:
      processing at least a first portion of the received mean values to produce a low-frequency component vector substantially identical to the low-frequency component vector produced in step (c) (i) for the input vector, said low-frequency component vector representing the input vector;

d') employing the reproduced representations of the input vectors to substantially re-create the image frame for display on a television set at the reception site.

24. Method according to claim 23 wherein said first portion of said received mean values comprises the mean value for the input vector under consideration and the mean values of at least a portion of the input vectors adjacent the input vector under consideration.

25. Method according to claim 23 wherein steps (b') (ii) and (c') are substantially identical to step (c) (i).

26. Method according to claim 23 wherein step (b') (ii) comprises applying a two-dimensional interpolating low-pass filter to said first portion of said received mean values.

27. Method according to claim 26 wherein step (c') is substantially identical to step (b') (ii).

28. Method according to claim 23 wherein step (b') (iii) comprises applying a two-dimensional interpolator to at least a second portion of the received mean values, whereby step (b') (iii) is not dependent upon step (b') (ii).

29. Method according to claim 28 wherein the second portion of the received mean values is substantially identical to the first portion of the received mean values.

30. Method according to claim 23 wherein the image frame comprises a matrix of image samples, and wherein each input vector represents a sub-matrix of said matrix of samples, and wherein each input vector is reproduced sample-by-sample, and wherein the image frame is re-created sample-by-sample.

31. Method according to claim 30 wherein the image samples represent pixel values.

32. Image compression apparatus comprising:
  means for receiving a plurality of multi-dimensional input vectors representative of an image to be compressed;
  a first mean value calculator for calculating a scalar mean value of each input vector;
  an interpolating low-pass filter for interpolating a low-frequency component vector representative of a low-pass version of a current input vector, the low-frequency component vector being interpolated from the scalar mean values of at least a portion of the input vectors;
  a first subtracting circuit for subtracting the low-frequency component vector from the current input vector to produce a low-frequency removed vector;
  a second mean value calculator for calculating the scalar mean value of the low-frequency removed vector;
  a second subtracting circuit for subtracting the scalar mean value of the low-frequency removed vector therefrom to produce a residual vector;
  a codebook having a plurality of codevectors, each codevector being representative of a possible residual vector, each codevector having an associated identification (ID) code;
  a controller for selecting one of the codevectors in the codebook that most closely resembles the residual vector; and
  a transmitter for transmitting data indicative of the ID code of the selected codevector.

33. Data compression apparatus according to claim 32 further comprising means for transmitting the scalar mean value of each input vector.

34. Data compression apparatus according to claim 32 further comprising a memory for storing the scalar mean value of each input vector.

35. Data compression apparatus according to claim 32 wherein the codebook has a tree-structure and the controller employs a distortion adaptive vector quantization technique to select one of the codevectors.

36. Data compression apparatus according to claim 32 wherein the interpolating low-pass filter interpolates the low-frequency component vector from the scalar mean value of the current input vector and the scalar mean values of at least a portion of the input vectors adjacent the current input vector.

37. Data compression apparatus according to claim 32 further comprising a difference calculator for calculating a measure of difference between the low-frequency component vector and the current input vector.

38. Data compression apparatus according to claim 37 wherein the controller does not select a codevector from the codebook when the measure of difference calculated by the difference calculator is less than a threshold value, but instead provides an instruction indicating that the current input vector is substantially similar to the low-frequency component vector, and wherein in such instance, the transmitter transmits the instruction.

39. A decoder for use at a reception site of vector quantization data, wherein the vector quantization data originates from an encoding site employing a vector quantization encoder to compress input vectors indicative of blocks of data defining an image frame, the encoder transmitting a scalar mean value of each input vector and additionally transmitting, for each input vector, data indicative of an identification (ID) code associated with a residual codevector selected from a first vector quantization codebook, the decoder comprising:
  a second codebook being substantially identical in content to the first codebook;
  a first memory for storing at least the scalar mean values, transmitted from the encoding site, of input vectors for a current image frame;
  a second memory for storing the ID code transmitted from the encoding site for each input vector of the current image frame;
  an interpolating low-pass filter coupled to the first memory for interpolating a low-frequency component vector representative of a low-pass version of an input vector to be reconstructed and for providing the low-frequency component vector on an output thereof, the low-frequency component vector being interpolated from the scalar mean value of the input vector to be reconstructed and the scalar mean values of adjacent input vectors;
  a mean value calculator for calculating the scalar mean value of the low-frequency component vector and for providing the scalar mean value of the low-frequency component vector on an output thereof;
  a subtractor circuit having a first input coupled to the output of the interpolating low-pass filter and a second input coupled to the output of the mean value calculator for subtracting the scalar mean value of the low-frequency component vector therefrom to produce a zero-mean low-frequency component vector and for providing the zero-mean low-frequency component vector on an output thereof;

a controller for accessing the second memory to obtain the ID code transmitted for the input vector to be reconstructed and for retrieving from the second codebook, the residual codevector having the ID code associated therewith and for providing the residual codevector on an output of the controller;

a summing circuit having a first input coupled to the output of the subtractor circuit, a second input coupled to the first memory, and a third input coupled to the input of the controller for adding the zero-mean low-frequency component vector for the input vector to be reconstructed, the scalar mean value stored in the second memory for the input vector to be reconstructed, and the residual codevector retrieved from the second codebook for the input vector to be reconstructed, and for providing the sum on an output thereof, the sum being a substantial representation of the input vector;

at least one converter coupled to the output of the summing circuit for converting the substantial representation of the input vector to NTSC format image data and for providing the NTSC format image data at an output thereof for display on a display device at the locale of the reception site.

40. Decoder according to claim 39 wherein the mean value calculator comprises an interpolator and wherein the scalar mean value of the low-frequency component vector is interpolated from the scalar mean value of the input vector under reconstruction and from the scalar mean values of adjacent input vectors, whereby the scalar mean value of the low-frequency component vector may be calculated without first obtaining the low-frequency component vector.

41. Decoder according to claim 39 wherein all vectors comprise a plurality of individual samples, and wherein the low-frequency component vectors are interpolated sample-by-sample and the input vectors are reconstructed and converted to NTSC format data sample-by-sample.

42. Decoder according to claim 41 wherein storage of real-time image data prior to display is not required.

43. A decoder for use at a reception site of vector quantization data, wherein the vector quantization data originates from an encoding site employing a vector quantization encoder to compress input vector indicative of blocks of data defining an image frame, the encoder transmitting a scalar mean value of each input vector and additionally transmitting, for each input vector, either (i) data indicative of an identification (ID) code associated with a residual codevector selected from a first vector quantization codebook, or (ii) an instruction to approximate the input vector by a low-frequency component vector interpolated from the scalar mean value of the input vector and the scalar mean values of adjacent input vectors, the decoder comprising:

a second codebook being substantially identical in content to the first codebook;

a first memory for storing at least the scalar mean values, transmitted from the encoding site, of input vectors for a current image frame;

a second memory for storing (i) the ID code or (ii) the instruction transmitted from the encoding site for each input vector of the current image frame;

an interpolating low-pass filter coupled to the first memory for interpolating a low-frequency component vector representative of a low-pass version of an input version to be reconstructed and for providing the low-frequency component vector on an output thereof, the low-frequency component vector being interpolated from the scalar mean value of the input vector to be reconstructed and the scalar mean values of adjacent input vectors;

a mean value calculator for calculating the scalar mean value of the low-frequency component vector and for providing the scalar mean value of the low-frequency component vector on an output thereof;

a subtractor circuit having a first input coupled to the output of the interpolating low-pass filter and a second input coupled to the output of the mean value calculator for subtracting the scalar mean value of the low-frequency component vector therefrom to produce a zero-mean low-frequency component vector and for providing the zero-mean low-frequency component vector on an output thereof;

a controller for accessing the second memory to determine whether an ID code or an instruction was transmitted for the input vector to be reconstructed, and where an ID code was transmitted for the input vector to be reconstructed, retrieving from the second codebook, the residual codevector having the ID code associated therewith and for providing the residual codevector on a first output thereof and a control signal on a second output thereof;

a summing circuit having a first input coupled to the output of the subtractor circuit, a second input coupled to the second memory, and a third input coupled to the first output of the controller for adding the zero-mean low-frequency component vector for the input vector to be reconstructed, the scalar mean value stored in the second memory for the input vector to be reconstructed, and the residual codevector retrieved from the second codebook for the input vector to be reconstructed, and for providing the sum on an output thereof, the sum being a substantial representation of the input vector;

a multiplexor having first and second data inputs and a data selector input, the first data input being coupled to the output of the summing circuit, the second data input being coupled to the output of the interpolating low-pass filter, and the data selector input being coupled to the second output of the controller for providing on an output of the multiplexor, in accordance with the control signal from the controller, either (i) the substantial representation of the input vector, or (ii) the low-frequency component vector which represents a low-pass version of the input vector; and at least one converter coupled to the output of the multiplexor for converting the multiplexor output to NTSC format image data and for providing the NTSC format image data at an output thereof for substantially reproducing the image frame that was input to the encoding site, whereby if the controller determines that an ID code was transmitted for the input vector to be reconstructed, then the controller selects the first data input of the multiplexor and the substantial representation of the input vector is converted to NTSC format image data, but if the controller determines that an instruction was transmitted for the input vector to be reconstructed then the controller selects the second data input of the multiplexor and the low-frequency component vector, which represents a low-pass version of the input vector, is converted to NTSC format image data as an approximation of the input vector.

44. Decoder according to claim 43 wherein the mean value calculator comprises an interpolator and wherein the scalar mean value of the low-frequency component vector is interpolated from the scalar mean value of the input vector under reconstruction and from the scalar mean values of adjacent input vectors, whereby the scalar mean value of the low-frequency component vector may be calculated without first obtaining the low-frequency component vector.

45. Decoder according to claim 43 wherein all vectors comprise a plurality of individual samples, and wherein the low-frequency component vectors are interpolated sample-by-sample and the input vectors are reconstructed and converted to NTSC format data sample-by-sample.

46. Decoder according to claim 43 wherein storage of real-time image data prior to display is not required.

* * * * *